United States Patent [19]

Kobayashi et al.

[11] Patent Number: 5,428,586
[45] Date of Patent: Jun. 27, 1995

[54] MAGNETO-OPTICAL RECORDING METHOD USING A MAGNETO-OPTICAL RECORDING MEDIUM HAVING TWO OR MORE MAGNETIC LAYERS TO ALLOW RECORDING AND REPRODUCTION TO BE EFFECTED SIMULTANEOUSLY AND MAGNETO-OPTICAL RECORDING MEDIUM USED IN THE METHOD

[75] Inventors: Tadashi Kobayashi, Tsu; Koyo Hasegawa, Tokyo; Kazuoki Hongu, Yokohama; Masakuni Yamamoto, Yamato, all of Japan

[73] Assignee: Canon Kabushiki Kaisha, Tokyo, Japan

[21] Appl. No.: 257,453

[22] Filed: Jun. 8, 1994

Related U.S. Application Data

[63] Continuation of Ser. No. 913,481, Jul. 14, 1992, abandoned.

[30] Foreign Application Priority Data

Jul. 16, 1991 [JP] Japan .................... 3-175159
Aug. 29, 1991 [JP] Japan .................... 3-218446
Jan. 8, 1992 [JP] Japan .................... 4-018451

[51] Int. Cl.$^6$ ............................................. G11B 13/04
[52] U.S. Cl. ........................... 369/13; 369/110; 360/59
[58] Field of Search .................. 369/13, 110, 14, 15; 360/59, 114; 365/122; 428/694, 900, 928

[56] References Cited

U.S. PATENT DOCUMENTS

| | | | |
|---|---|---|---|
| 4,842,956 | 6/1989 | Kobayashi | 428/611 |
| 4,932,012 | 6/1990 | Kobayashi | 369/13 |
| 5,132,945 | 7/1992 | Osato et al. | 369/13 |
| 5,163,031 | 11/1992 | Osato | 369/13 |
| 5,224,068 | 6/1993 | Miyake et al. | 369/13 |
| 5,325,434 | 6/1994 | Ohtsuki | 369/13 |
| 5,343,449 | 8/1994 | Miyata | 369/13 |

FOREIGN PATENT DOCUMENTS

| | | |
|---|---|---|
| 0258978 | 3/1988 | European Pat. Off. . |
| 0309200 | 3/1989 | European Pat. Off. . |
| 0309232 | 3/1989 | European Pat. Off. . |
| 0352548 | 1/1990 | European Pat. Off. . |
| 0368194 | 5/1990 | European Pat. Off. . |
| 0428128 | 5/1991 | European Pat. Off. . |
| 0429221 | 5/1991 | European Pat. Off. . |
| 0437308 | 7/1991 | European Pat. Off. . |
| 0515219 | 11/1992 | European Pat. Off. . |
| 3-73448 | 3/1991 | Japan . |

OTHER PUBLICATIONS

Patent Abstracts of Japan, No. 02-078042, vol. 14, No. 272, Jun. 1990.
Patent Abstracts of Japan, No. 01-217744, vol. 13, No. 530, Nov. 1989.
Patent Abstracts of Japan, No. 03-189929, vol. 15, No. 451, Nov. 1991.
Patent Abstracts of Japan, No. 03-086955, vol. 15, No. 266, Jul. 1991.
Patent Abstracts of Japan, No. 02-201,756, Section E, Wk. 9038, Aug. 1990.
Patent Abstracts of Japan, No. 61-276149, vol. 11, No. 137, May 1987.
Patent Abstracts of Japan, No. 03-073448, vol. 15, No. 237, Jun. 1991.
Patent Abstracts of Japan, No. 61-276149, vol. 11, No. 137, May 1987.
Patent Abstracts of Japan, No. 03-073448, vol. 15, No. 237, Jun. 1991.
Patent Astracts of Japan, Kokai No. 03-207040, vol. 15, No. 480, Dec. 1991.

*Primary Examiner*—Georgia Y. Epps
*Assistant Examiner*—Tan Dinh
*Attorney, Agent, or Firm*—Fitzpatrick, Cella, Harper & Scinto

[57] ABSTRACT

A magneto-optical recording method employs a magneto-optical recording medium having a first magnetic layer which exhibits a low coercive force at room temperature and a high Curie temperature and a second magnetic layer which is exchange-coupled to the first magnetic layer and which exhibits a higher coercive force and a lower Curie temperature as compared with those of the first magnetic layer. A magnetic field modulated in accordance with information to be recorded is applied to the magneto-optical recording medium while irradiating it with a light beam of a constant intensity so as to record the information. The recorded information is simultaneously confirmed by using a reflected light of this light beam.

8 Claims, 19 Drawing Sheets

FIG. 14A
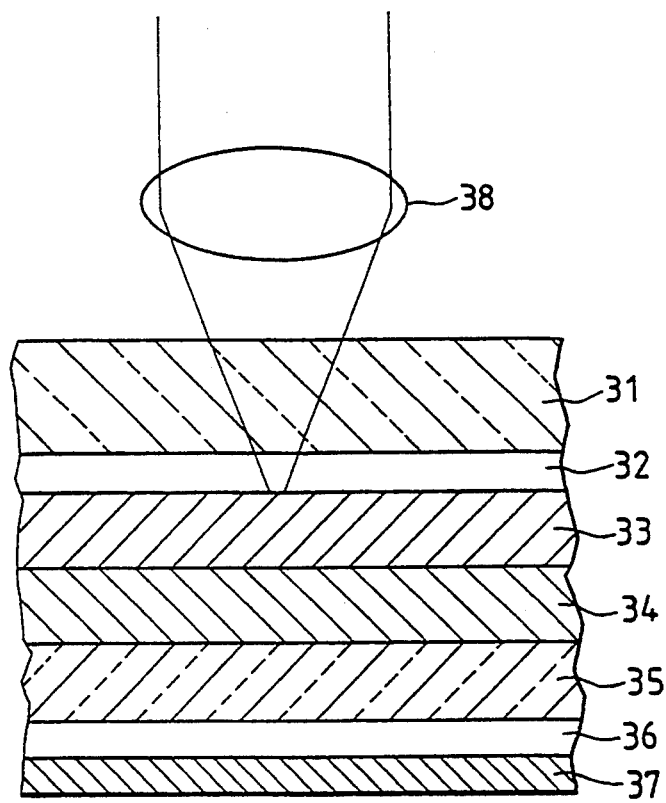
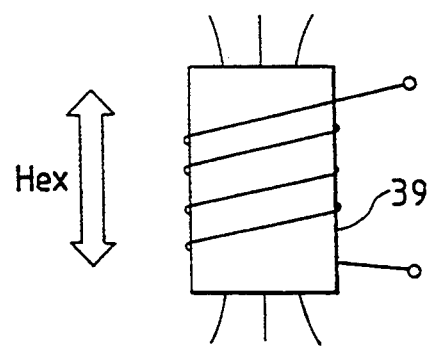
FIG. 14B

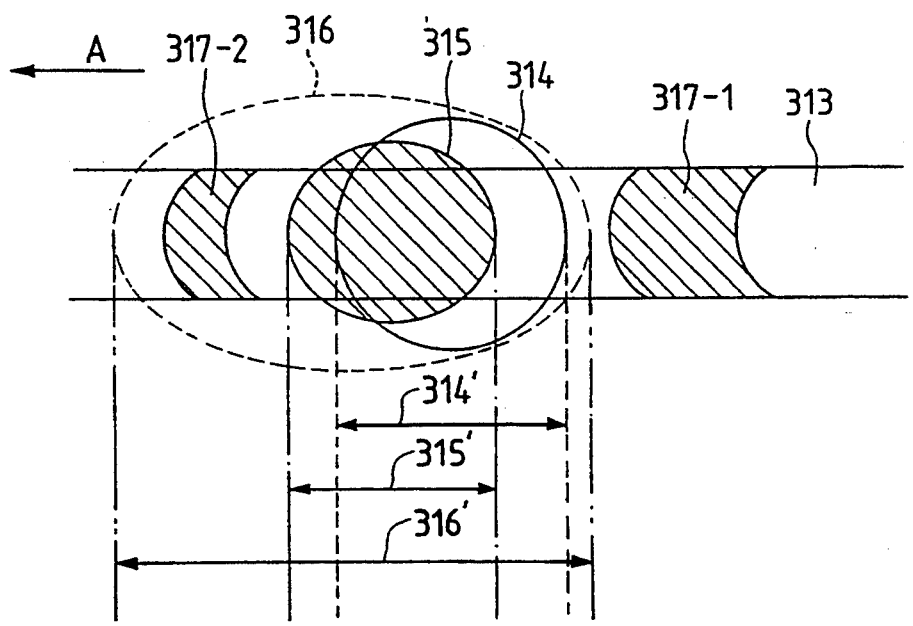
FIG. 16A
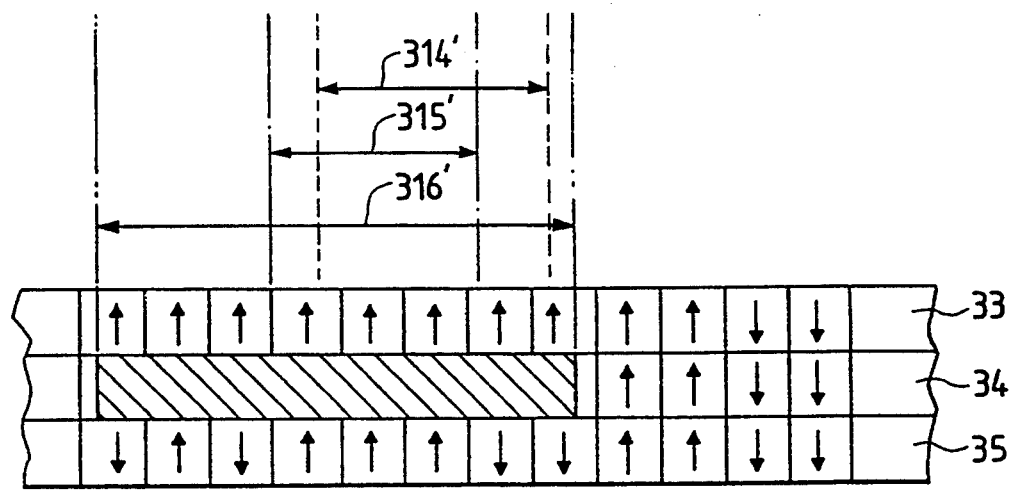
FIG. 16B₁
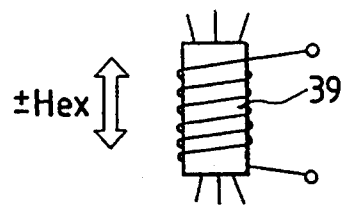
FIG. 16B₂

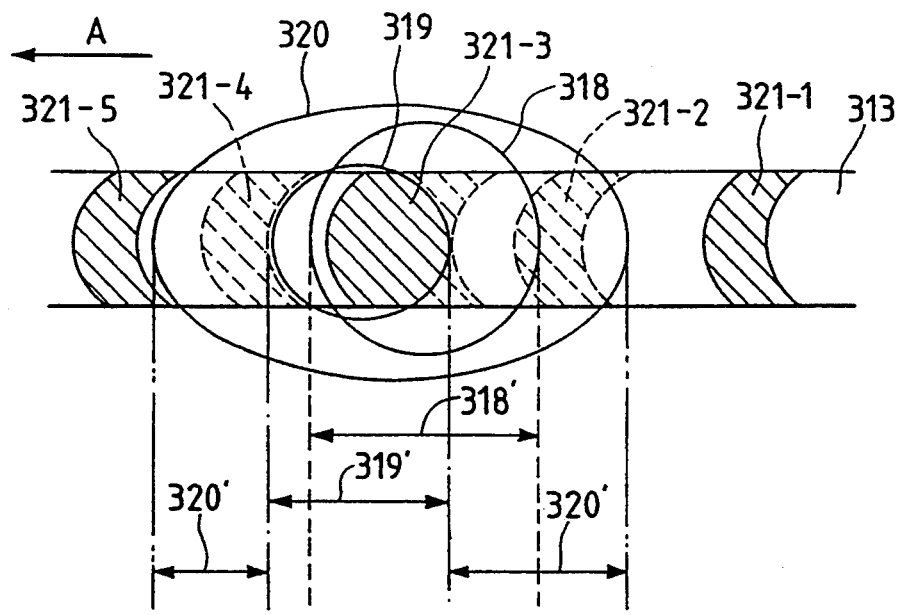
FIG. 17A
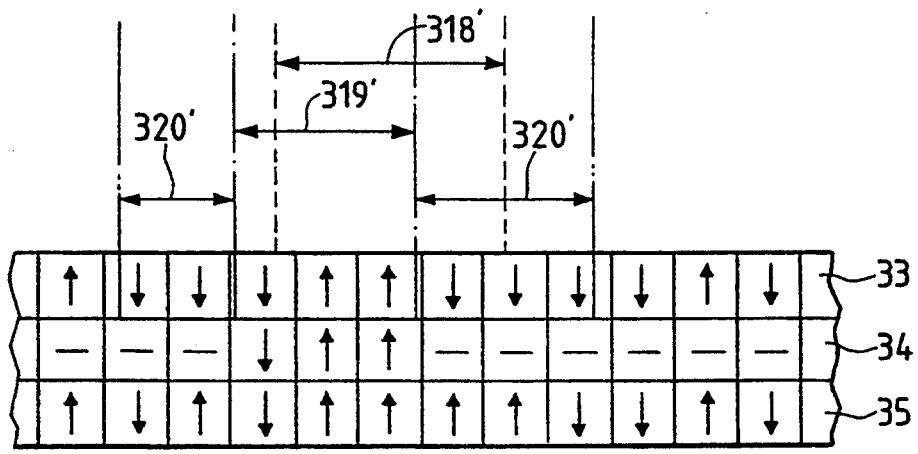
FIG. 17B₁
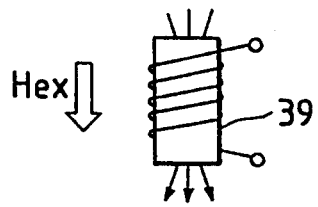
FIG. 17B₂

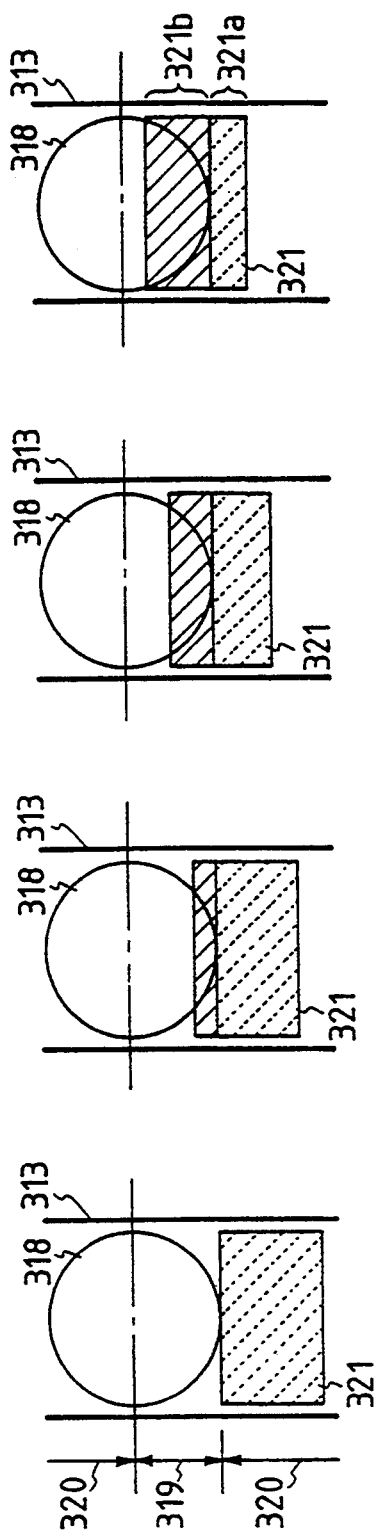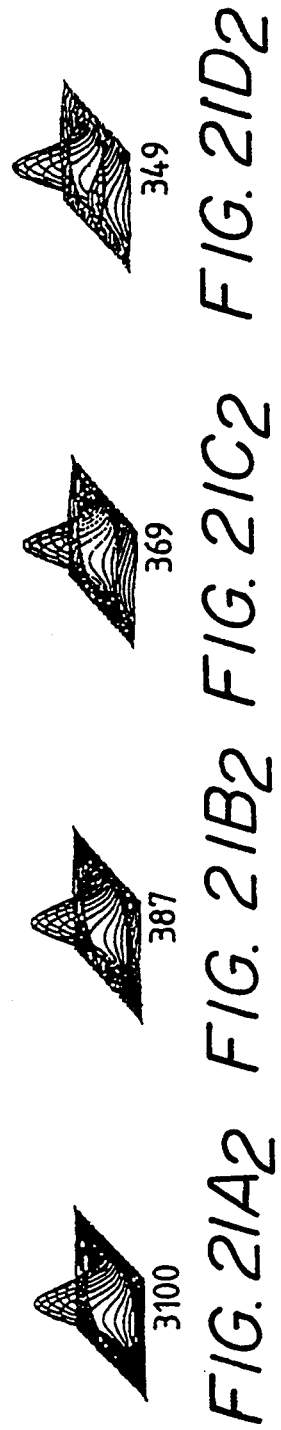

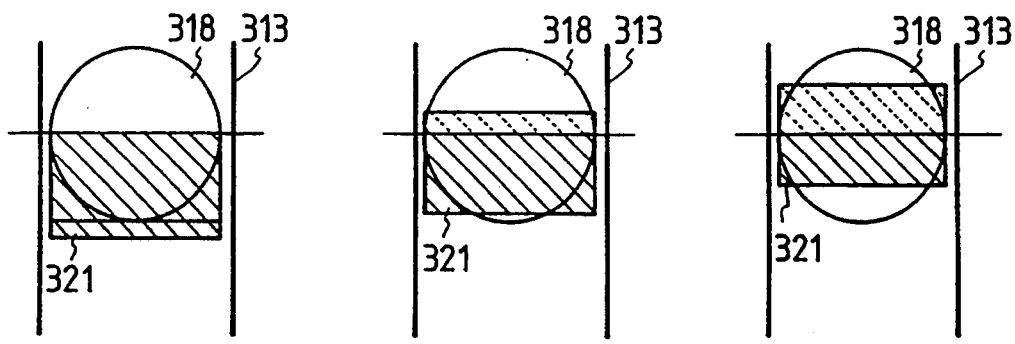
FIG. 21E₁   FIG. 21F₁   FIG. 21G₁
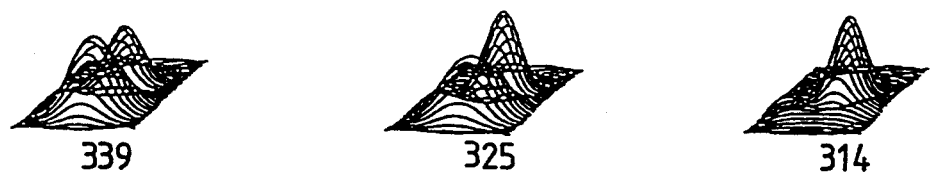
FIG. 21E₂   FIG. 21F₂   FIG. 21G₂

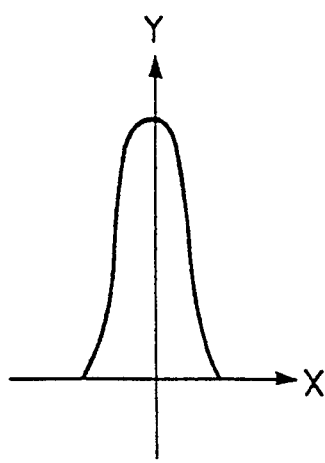
FIG. 24A₁
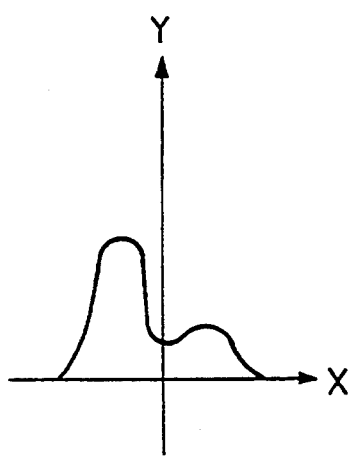
FIG. 24B₁
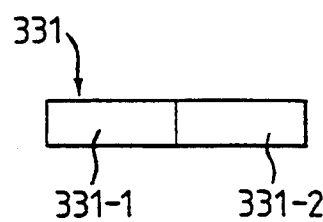
FIG. 24A₂
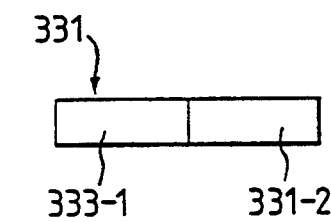
FIG. 24B₂
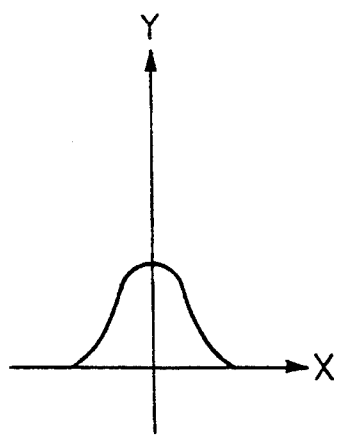
FIG. 24C₁
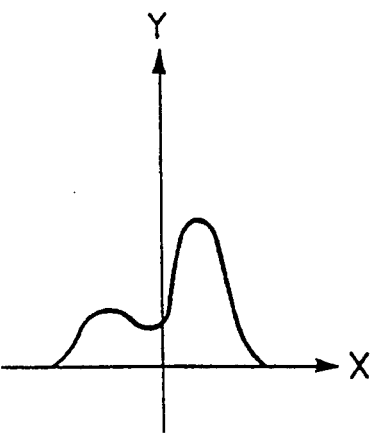
FIG. 24D₁
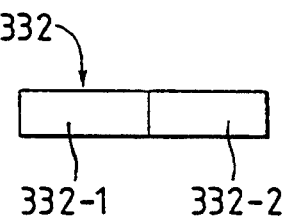
FIG. 24C₂
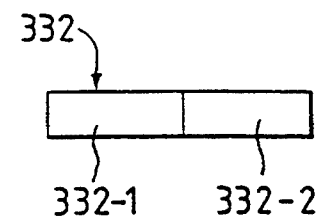
FIG. 24D₂

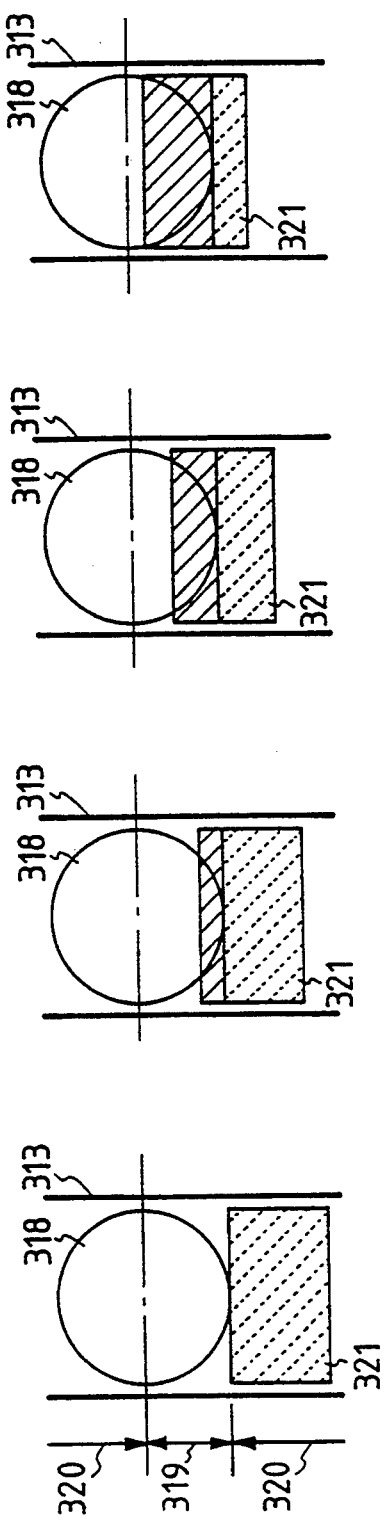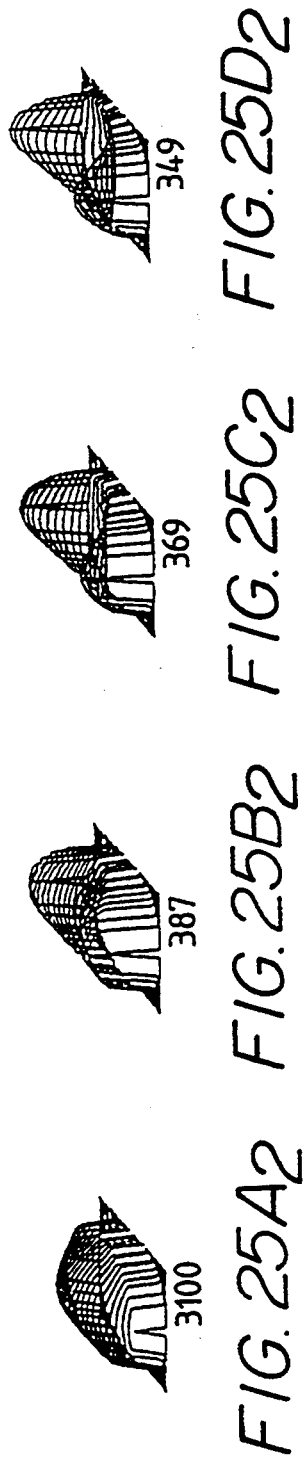

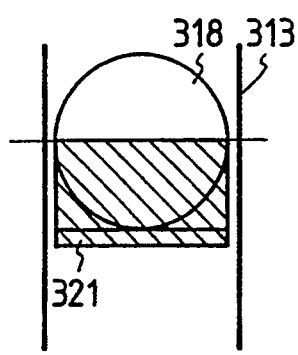 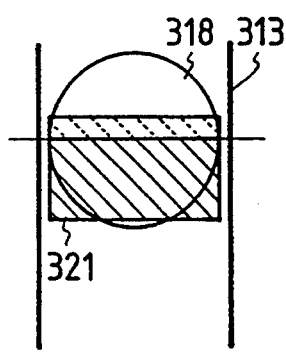 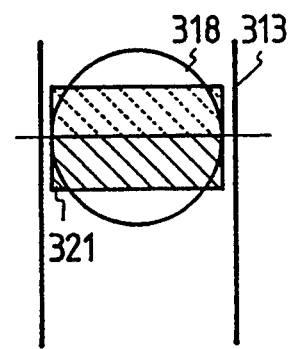
FIG. 25E₁    FIG. 25F₁    FIG. 25G₁
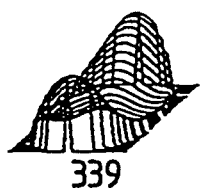 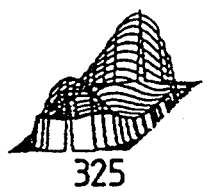 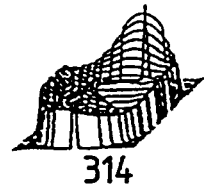
FIG. 25E₂    FIG. 25F₂    FIG. 25G₂

MAGNETO-OPTICAL RECORDING METHOD USING A MAGNETO-OPTICAL RECORDING MEDIUM HAVING TWO OR MORE MAGNETIC LAYERS TO ALLOW RECORDING AND REPRODUCTION TO BE EFFECTED SIMULTANEOUSLY AND MAGNETO-OPTICAL RECORDING MEDIUM USED IN THE METHOD

This application is a continuation of application Ser. No. 07/913,481 filed Jul. 14, 1992, now abandoned.

BACKGROUND OF THE INVENTION

1. Field of the Invention

The present invention relates to a magneto-optical recording method which allows recording and reproduction of information to be effected simultaneously by means of a laser beam (a light beam), and to a magneto-optical recording medium used in such a method.

2. Related Background Art

A magneto-optical recording medium (hereinafter referred to as a "magneto-optical disc") has recently become of major interest as a recording medium which has a large capacity, which allows rewriting of information, and which is interchangeable.

Information recording on such a magneto-optical disc has been conducted by the following procedures:

(i) An initializing magnetic field is applied to a rotating magneto-optical disc and, at the same time, the portion of the disc where recording is to be effected is irradiated with a laser beam of continuous light so as to erase the previous information;

(ii) Next, a recording magnetic field whose magnetic field orientation is different from that of the initializing magnetic field that is applied to the rotating magneto-optical recording disc and, at the same time, the portion of the disc where recording is to be effected is irradiated with a laser beam modulated in accordance with the recording information so as to effect information recording; and (iii) Finally, the disc portion where the information recording has been effected is irradiated with a laser beam of a weak continuous light so as to read the recorded information, thereby checking whether the recording has been effected correctly or not.

The checking of (iii) must always be performed since, in magneto-optical recording, it may happen that the recording cannot be correctly performed due to any defect, degeneration and corrosion of the recording medium, dust, any failure of the recording apparatus, etc.

As is apparent from the above description, information recording requires a time corresponding to three rotations of the disc. If it can be performed in a time corresponding to two, or further, one rotation of the disc, the processing speed for the information recording process will be much increased.

To achieve this, various methods have been proposed.

For example, to effect (i) and (ii) simultaneously, (that is, to effect over-write recording), a laser beam of continuous light is applied under an external magnetic field modulated in accordance with recording information.

According to another method, a special medium is used and a laser beam modulated in intensity in accordance with recording information is applied under a D.C. external magnetic field. By adopting such methods, it is possible to perform procedures (i) and (ii) simultaneously and effect information recording in a time corresponding to two rotations of the disc.

Further, in addition to the above methods, there has been proposed a method according to which two laser beams are incorporated into one optical system, and recording is performed by means of the forward beam, and checking of the recording by the rearward beam.

By combining this record checking method with the above-described recording methods, it would be possible to perform procedures (i), (ii) and (iii) simultaneously, effecting information recording in a time corresponding to one rotation of the disc.

However, incorporating two laser beams into one optical system would excessively complicate the optical system. Furthermore, that would require a high level of mechanical precision in the optical system, resulting in an increase in the size of the optical system and in the production costs.

SUMMARY OF THE INVENTION

The present invention has been made in view of the above problems. It is accordingly an object of the present invention to provide a method which makes it possible to perform information recording with one rotation of the disc without using any expensive and complicated optical system, as well as a magneto-optical recording medium which is suitable for use in the method.

In accordance with the present invention, the above object can be achieved by a magneto-optical recording method comprising the steps of: preparing a magneto-optical recording medium having a first magnetic layer which exhibits a high coercive force at room temperature and a high Curie temperature and a second magnetic layer which is exchange-coupled to the first magnetic layer and which exhibits a higher coercive force and a lower Curie temperature as compared with those of the first magnetic layer; performing information recording by applying a magnetic field modulated in accordance with recording information to the magneto-optical recording medium while irradiating the magneto-optical recording medium with a light beam of a constant intensity; and checking the recorded information by using a reflected light of the light beam.

Further, the above object can be achieved by a magneto-optical recording method comprising the steps of: preparing a magneto-optical recording medium having a first magnetic layer, a second magnetic layer which is exchange-coupled to the first magnetic layer and which exhibits a lower Curie temperature and a higher coercive force as compared with those of the first magnetic layer, and a third magnetic layer which is provided between the first and second magnetic layers and which exhibits a lower Curie temperature as compared with that of the second magnetic layer; irradiating the magneto-optical recording medium with a recording light beam of a predetermined intensity so as not to temporarily act on the exchange-coupled force between the first and second magnetic layers; and applying an external magnetic field modulated in accordance with information signals to be recorded to the magneto-optical recording medium to effect the recording of information and to cause the magnetization of the first magnetic layer to be oriented in the direction of the external magnetic field so as to check the recorded information by using a reflected light of the recording light beam.

Further, the above object can be achieved by a magneto-optical recording medium comprising a substrate on which are successively stacked the following layers:
  a first dielectric layer;
  a first magnetic layer;
  a second magnetic layer which exhibits a higher coercive force at room temperature and a lower Curie temperature as compared with those of the first magnetic layer;
  a metal layer of 20 Å or more and 70 Å or less; and
  a second dielectric layer,
  wherein the metal layer has a heat conductivity which is higher than those of the second magnetic layer and the second dielectric layer.

BRIEF DESCRIPTION OF THE DRAWINGS

FIG. 14A is a sectional view and FIG. 14B is a view of a magneto-optical recording medium suitable for use in a second embodiment of the magneto-optical recording method of the present invention;

FIGS. 16A, 16B$_1$ and 16B$_2$ are diagrams showing the information recording process in the second embodiment of the magneto-optical recording method of the present invention;

FIGS. 17A, 17B$_1$ and 17B$_2$ are diagrams showing the information reproduction process of the recording medium shown in FIG. 14;

FIGS. 21A$_1$ to 21G$_2$ are diagrams showing changes in the light intensity distribution and the total light quantity when the proportion of the magnetic domain in the transferable area is varied at the time of spot scanning by a reproducing light spot;

FIGS. 24A$_1$ to 24D$_2$ are diagrams showing the light intensity distribution obtained on a two-divided photodetector when polarization interference is effected by overlapping the P-axis light component on the S-axis light component; and FIGS. 25A$_1$ to 25G$_2$ are diagrams showing the changes of the light strength distribution and the total light quantity when a shift from a re-imaging point occurs in the optical axis at the time of spot scanning with a re-imaging light spot.

DETAILED DESCRIPTION OF THE PREFERRED EMBODIMENTS

[First Embodiment]

Figure 1:
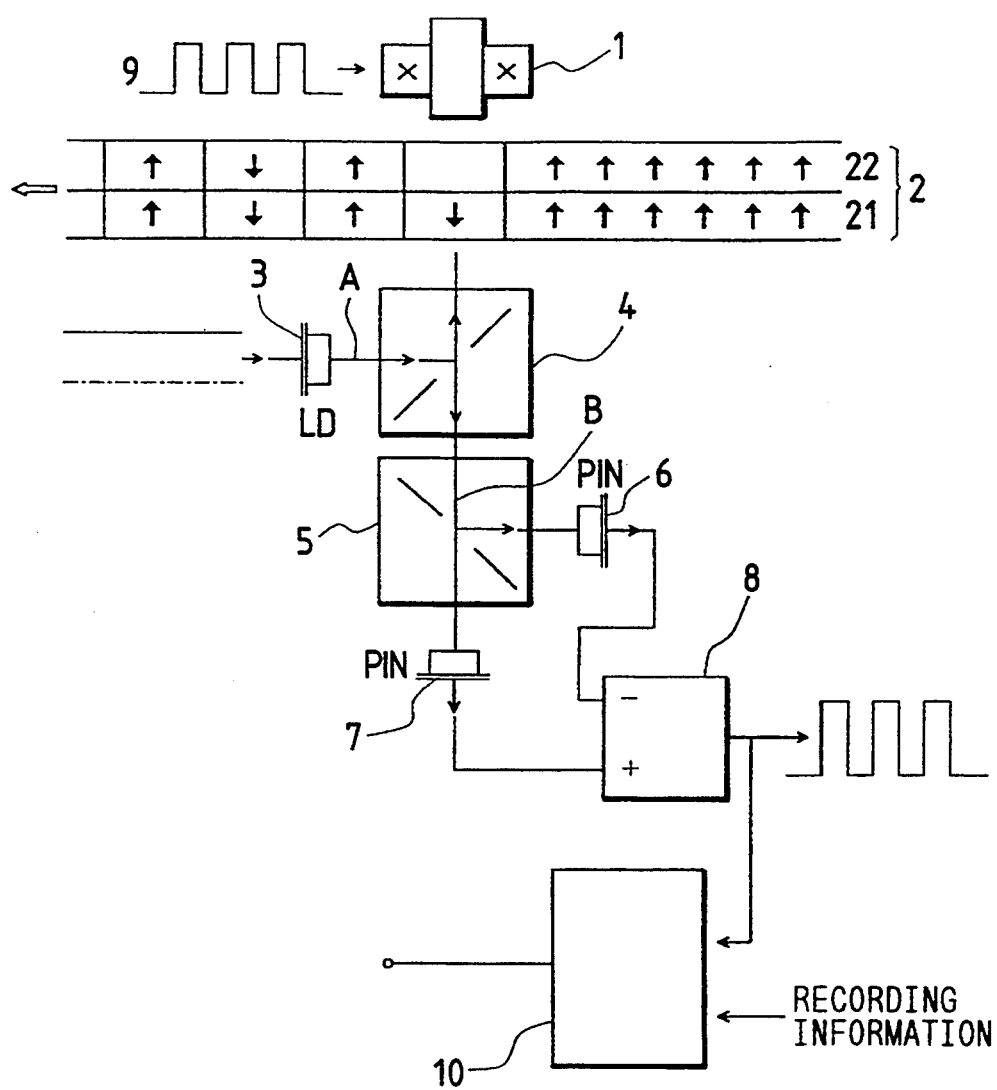
FIG. 1 is a diagram showing an example of a drive device for the magneto-optical recording method of the present invention.

FIG. 1 is a schematic diagram showing an example of a drive device for executing the magneto-optical recording method of the present invention. In the drawing, numeral 1 indicates a coil for applying an external magnetic field to a recording medium. The magnetic field of the coil is modulated by a modulation circuit (not shown) in accordance with information to be recorded. Numeral 2 indicates a recording medium, which includes a first magnetic layer 21 which exhibits a low coercive force at room temperature and a high Curie temperature, and a second magnetic layer which is exchange-coupled to the first magnetic layer and which exhibits a higher coercive force and a lower Curie temperature as compared with those of the first magnetic layer. Numeral 3 indicates a semiconductor laser; numeral 4, a half prism; numeral 5, a polarizing beam splitter which is disposed to be inclined by 45° so as to function as an analyzer; numerals 6 and 7, photodiodes (PIN photos); numeral 8, a differential amplifier including a binarizing circuit; and numeral 10, a comparator for confirming by comparing reproduction information from the recording medium with recording information to be recorded on the recording medium.

Next, the operating principle of the present invention will be described.

When, during its rotation by a spindle motor (not shown), the recording medium 2 is irradiated with a laser beam of a constant intensity (taking into account the rotating speed of the recording medium 2, the intensity is set beforehand such that the temperature of the second magnetic layer is raised to a level near the Curie temperature at the time of irradiation of the recording medium 2), the section of the recording medium which is irradiated with the laser beam A rises, with the result that the magnetization of the second magnetic layer 22 with lower Curie temperature disappears. The first magnetic layer 21, however, has a Curie temperature higher than that of the second magnetic layer 22, so that its magnetization remains. When the magnetization of the second magnetic layer disappears, the exchange-coupling force between the first and second magnetic layers does not act, so that the first magnetic layer exhibits an inherent, low coercive force (while the exchange-coupling function is effective, the apparent coercive force of the first magnetic layer is large due to the coercive force of the second magnetic layer). When, in this condition, an external magnetic field generated by the coil 1 (which has been modulated in terms of magnetic field direction in accordance with recording information) is applied to the recording medium, the magnetization of the first magnetic layer is caused to be magnetized in the direction of that magnetic field, thereby effecting information recording.

The magnetization direction of the first magnetic layer is detected on a real-time basis by the photodiodes 6 and 7 as a change in the magneto-optical effect (Kerr effect or Faraday effect) of a reflected light B of the laser beam A with which the recording medium 2 is irradiated. More specifically, the laser beam A which has applied on the position where the magnetic field of the coil 1 has been applied is reflected by the recording medium 2 and is caused to be incident on the photodiodes 6 and 7 by way of the half prism 4 and the polarizing beam splitter 5. Then, the outputs of the photodiodes 6 and 7 are supplied to the differential amplifier 8, where they undergo differential amplification and binary coding so as to be extracted as reproduction signals. These reproduction signals are compared with the recording information at the comparator 10. If the reproduction signals do not coincide with the recording information, a series of recording information is re-recorded at the same on a different position on the recording medium. If the reproduction signals coincide with the recording information, the re-recording is not performed. The re-recording may be performed after the completion of the recording of the series of information or immediately after the detection of the disagreement of the reproduction signals with the recording information. Thus, when recording cannot be correctly performed due to any defect, deterioration or corrosion of the recording medium, dust, or any failure of the magneto-optical recording apparatus, the reproduction signals are in an abnormal condition, thus enabling the recording to be checked.

Figure 2:
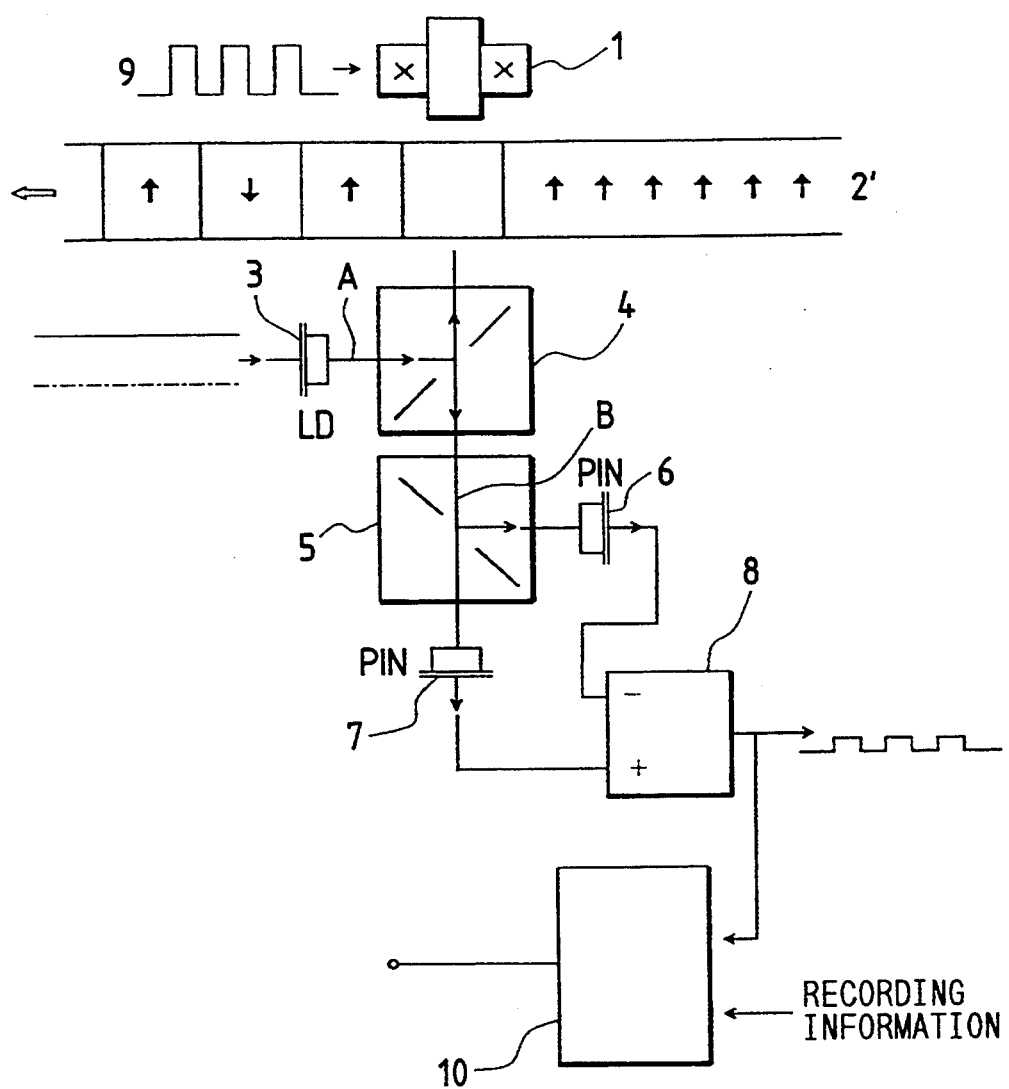
FIG. 2 is a diagram showing a conventional magneto-optical recording method.

Next, an explanation will be given of the use in the present invention of a recording medium having a first magnetic layer which exhibits a low coercive force at room temperature and a high Curie temperature and a second magnetic layer which is exchange-coupled to the first magnetic layer and which exhibits a higher coercive force and a lower Curie temperature as compared with those of the first magnetic layer. FIG. 2 shows a case where an ordinary magnetic substance having a high coercive force at room temperature and a low Curie temperature, which consists of TbFeCo or the like, is used for a recording medium as a single layer. When the laser beam A is applied to the recording medium 2', the temperature of the medium increases and the magnetization of the magnetic layer disappears. In this case, the reflected light B of the laser beam A from the recording medium 2' receives no magneto-optical effect because of the diasppearance of the magnetization at the laser beam irradiating section. That is, the reproduction signals cannot be detected. Thus, when an ordinary magnetic substance is used as the material of a single layer recording medium, it is impossible to perform recording check by means of the reflected light B of the laser beam A applied to the recording position of the recording medium for the purpose of recording.

In view of this, a recording medium which can be used in the present invention should at least have a construction comprising a first magnetic layer which exhibits a low coercive force at room temperature and a high Curie temperature, and a second magnetic layer which is exchange-coupled to the first magnetic layer and which exhibits a higher coercive force and a lower Curie temperature as compared with those of the first magnetic layer. Various constructions are possible for the recording medium of the present invention. The following are examples thereof:

EXAMPLE 1

A recording medium comprising: a transparent substrate on which a laser beam is introduced; a first dielectric layer; a first magnetic layer; a second magnetic layer; and a second dielectric layer.

The first dielectric layer has the function of protecting the magnetic layer and/or, due to the light interference effect, enhancing the recording sensitivity by a reduction in light reflectivity and enhancing the magneto-optical effect so as to enlarge the reproduction signals. A preferable material for the first dielectric layer is a dielectric substance such as SiN (silicon nitride). The refractive index and the thickness of the layer are determined in accordance with the wavelength of the laser used.

It is desirable that the thickness of the first magnetic layer be such that the laser beam is not allowed to reach the second magnetic layer. An excessive thickness, however, is not undesirable since that would impair the exchange-coupling effect provided by the second magnetic layer. Thus, the thickness is to be determined taking these factors into account so as to maintain a balance therebetween.

The thickness of the second magnetic layer is determined so as to keep a balance between recording sensitivity and magneto-optical effect.

The second dielectric layer, which serves to protect the magnetic layer, need not be provided if no such protection is required.

EXAMPLE 2

A recording medium comprising: a transparent substrate on which a laser beam is introduced; a first dielectric layer; a first magnetic layer; a second magnetic layer; a second dielectric layer; and a metal layer.

In this example, a metal layer is provided on the second dielectric layer of Example 1, described above. Due to the heat conduction by this metal layer, an improvement is attained in terms of thermal responsiveness in the in-plane direction of the recording surface of the recording medium. In this case, the second dielectric layer functions as a thermal insulation layer between the magnetic layer and the metal layer. It need not be provided when no such insulating layer is required. Further, to protect the metal layer, a third dielectric layer may be provided on the metal layer.

EXAMPLE 3

A recording medium comprising: a transparent substrate to which a laser beam is applied; a first dielectric layer; a first thin magnetic layer; a second thin magnetic layer; a second dielectric layer; and a metal layer.

In this example, the first and second magnetic layers in Example 2 are made thinner so that the laser beam can reach the metal layer through the first and second magnetic layers. Due to the influence of the disappearance of the magneto-optical effect of the second mangetic layer, the magneto-optical effect of this recording medium at the time of recording becomes relatively low as compared with those of Examples 1 and 2 (though still considerably high when compared with the case in which the magnetic layer consists of a single layer), thus attaining an improvement in terms of recording sensitivity.

The first magnetic layer of the present invention is preferably made of a rare-earth/iron-group amorphous alloy, such as Gd—Fe—Co, Tb—Fe—Co, Dy—Fe—Co, Gd—Tb—Fe—Co, Gd—Dy—Fe—Co, Tb—Dy—Fe—Co, Nd—Fe—Co, Nd—Gd—Fe—Co, Nd—Tb—Fe—Co or Nd—Dy—Fe—Co, or a platinum-group/iron group periodic-structure film, such as Pt/Co. The second magnetic layer is preferably made of a rare-earth/iron-group amorphous alloy, such as Tb—Fe—Co, Dy—Fe—Co or Tb—Dy—Fe—Co.

It is desirable that the coercive force of the first magnetic layer be 1 kOe or less. The coercive force of the second magnetic layer is set preferably at several kOe or more, more preferably, at 5 kOe or more, and most preferably, at 10 kOe or more.

The Curie temperature of the first magnetic layer is preferably set at 200° C. or more, and more preferably, at 300° C. or more. The Curie temperature of the second magnetic layer is preferably set at 200° C. or less.

Elements for attaining an improvement in terms of corrosion resistance, such as Cr, Al, Ti, Pt and Nb, may be added to the first and second magnetic layers. A preferable amount of the elements added is approximately 1 atm % to 10 atm %, and more preferably, approximately 2 atm % to 6 atm %, with respect to the whole. When adding an element leading to a deterioration in magneto-optical effect, such as Cr, it is expedient to add a large amount of Co and a small amount of Cr to the first magnetic layer, and a small amount of Co and a large amount of Cr to the second magnetic layer.

Next, a temperature dependency of the magnetization inversion magnetic field of each magnetic layer of the recording medium of the present invention will be described.

In the following examples, the Gd—Fe—Co—Cr layer was prepared by simultaneous sputtering using a Gd target and an $Fe_{68}Co_{29}Cr_3$ target. The Tb—Fe—Co—Cr layer was prepared by simultaneous sputtering using a Tb target and an $Fe_{83}Co_{12}Cr_5$ target.

The Curie temperature of the Tb—Fe—Co—Cr layer is approximately 190° C., and the estimated Curie temperature of the Gd—Fe—Co—Cr layer is 300° C. or more.

Figure 3:
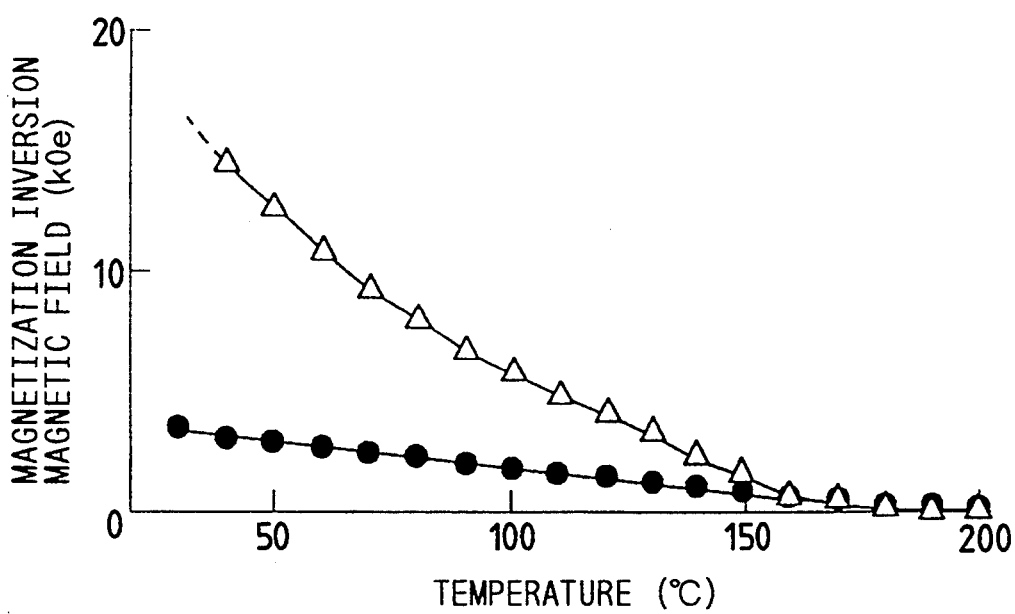
FIG. 3 is a diagram showing an example of the temperature dependency of the magnetization inversion magnetic field of a magneto-optical recording medium used in the magneto-optical recording method of the present invention.

FIG. 3 shows the temperature dependency of the magnetization inversion magnetic field of each magnetic layer of a recording medium of the composition of Example 1 which comprises: a first dielectric layer SiN (refractive index: 2.25; thickness: 516 Å); a first magnetic layer Gd—Fe—Co—Cr (Fe—Co sub-lattice magnetization predominant; saturation magnetization: 100 emu/cm³; thickness: 400 Å); a second magnetic layer Tb—Fe—Co—Cr (Fe—Co sub-lattice magnetization predominant; saturation magnetization: 100 emu/cm³; thickness: 400 Å); and a second dielectric layer SiN (refractive index: 2.25; thickness: 700 Å). Symbol Δ indicates the magnetization inversion magnetic field of the Tb—Fe—Co—Cr layer, and symbol ● indicates the magnetization inversion magnetic field of the Gd—Fe—Co—Cr layer.

As is well known, the Gd—Fe—Co—Cr layer, in which the Fe—Co sub-lattice magnetization is predominant and whose saturation magnetization is 100 emu/cm³, provides, when alone, a coercive force of only serveral tens of Oe or so. As shown in FIG. 3, by exchange-coupled with the Tb—Fe—Co—Cr layer, the magnetization inversion magnetic field of the Gd—Fe—Co—Cr layer rises to several kOe. When the temperature increases to approach the Curie temperature of the Tb—Fe—Co—Cr, the magnetization inversion magnetic fields of the Tb—Fe—Co—Cr layer and the Gd—Fe—Co—Cr layer are reduced. When the temperature reaches the Curie temperature of the Tb—Fe—Co—Cr layer, the magnetization of the Tb—Fe—Co—Cr layer disappears, and the exchange-coupling force from the Tb—Fe—Co—Cr layer ceases to act on the Gd—Fe—Co—Cr layer, with the result that the Gd—Fe—Co—Cr exhibits an inherent, small magnetization inversion magnetic field. That is, in this condition, magnetization inversion by an external magnetic field can be easily effected.

By using such a magnetic material, it is possible to realize the magneto-optical recording method of the present invention.

Figure 4:
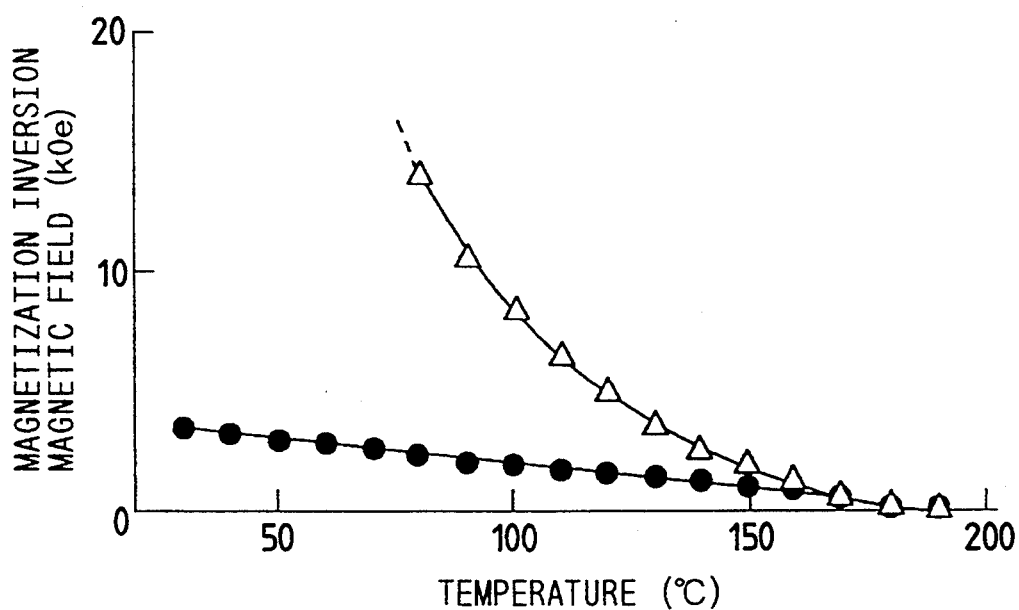
FIG. 4 is a diagram showing another example of the temperature dependency of the magnetization inversion magnetic field of a magneto-optical recording medium used in the magneto-optical recording method of the present invention.

FIG. 4 shows, as another example, the temperature dependency of the magnetization inversion magnetic field of each magnetic layer of a recording medium which comprises: a first dielectric layer SiN (refractive index: 2.25; thickness: 516 Å); a first magnetic layer Gd—Fe—Co—Cr (Fe—Co sub-lattice magnetization predominant; saturation magnetization: 100 emu/cm³; thickness: 400 Å); a second magnetic layer Tb—Fe—Co—Cr (saturation magnetization: 0 emu/cm³; thickness: 400 Å); and a second dielectric layer SiN (refractive index: 2.25; thickness: 700 Å).

Figure 5:
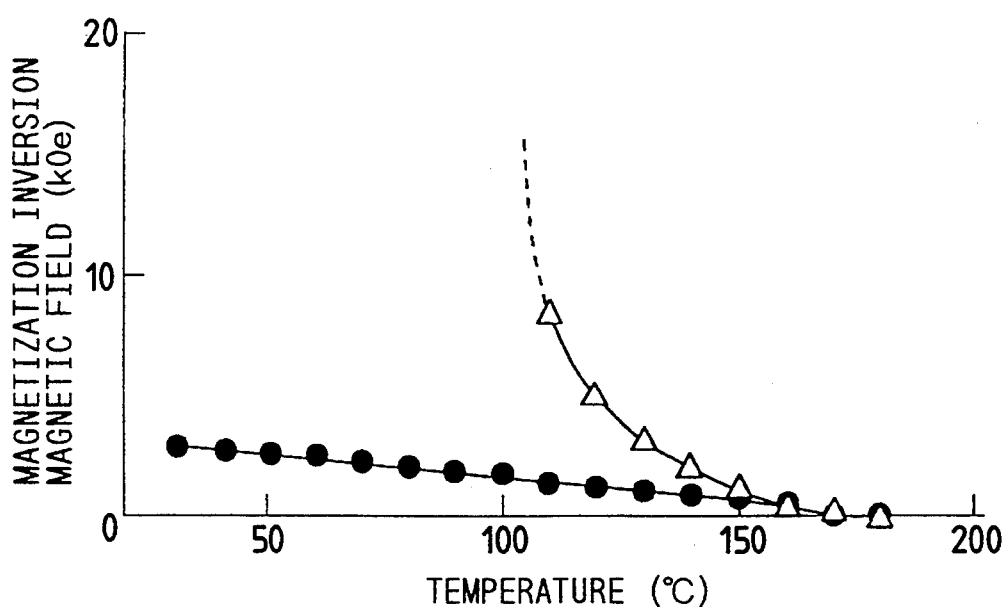
FIG. 5 is a diagram showing still another example of the temperature dependency of the magnetization inversion magnetic field of a magneto-optical recording medium used in the magneto-optical recording method of the present invention.

FIG. 5 shows, as still another example, the temperature dependency of the magnetization inversion magnetic field of each magnetic layer of a recording medium which comprises: a first dielectric layer SiN (refractive index: 2.25; thickness: 516 Å); a first magnetic layer Gd—Fe—Co—Cr (Fe—Co sub-lattice magnetization predominant; saturation magnetization: 100 emu/cm$^3$; thickness: 400 Å); a second magnetic layer Tb—Fe—Co—Cr (Tb sub-lattice magnetization predominant; saturation magnetization: 100 emu/cm$^3$; thickness: 400 Å); and a second dielectric layer SiN (refractive index: 2.25; thickness: 700 Å).

Figure 6:
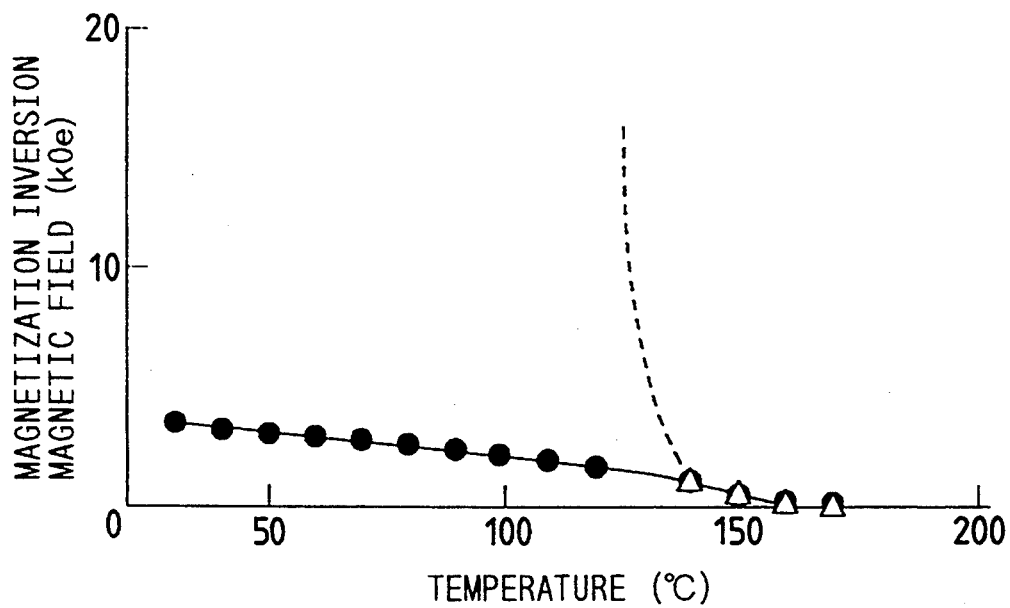
FIG. 6 is a diagram showing a further example of the temperature dependency of the magnetization inversion magnetic field of a magneto-optical recording medium used in the magneto-optical recording method of the present invention.

FIG. 6 shows, as a further example, the temperature dependency of the magnetization inversion magnetic field of each magnetic layer of a recording medium which comprises: a first dielectric layer SiN (refractive index: 2.25; thickness: 516 Å); a first magnetic layer Gd—Fe—Co—Cr (Fe—Co sub-lattice magnetization predominant; saturation magnetization: 100 emu/cm$^3$; thickness: 400 Å); a second magnetic layer Tb—Fe—Co—Cr (Tb sub-lattice magnetization predominant; saturation magnetization: 200 emu/cm$^3$; thickness: 400 Å); and a second dielectric layer SiN (refractive index: 2.25; thickness: 700 Å).

Figure 7:
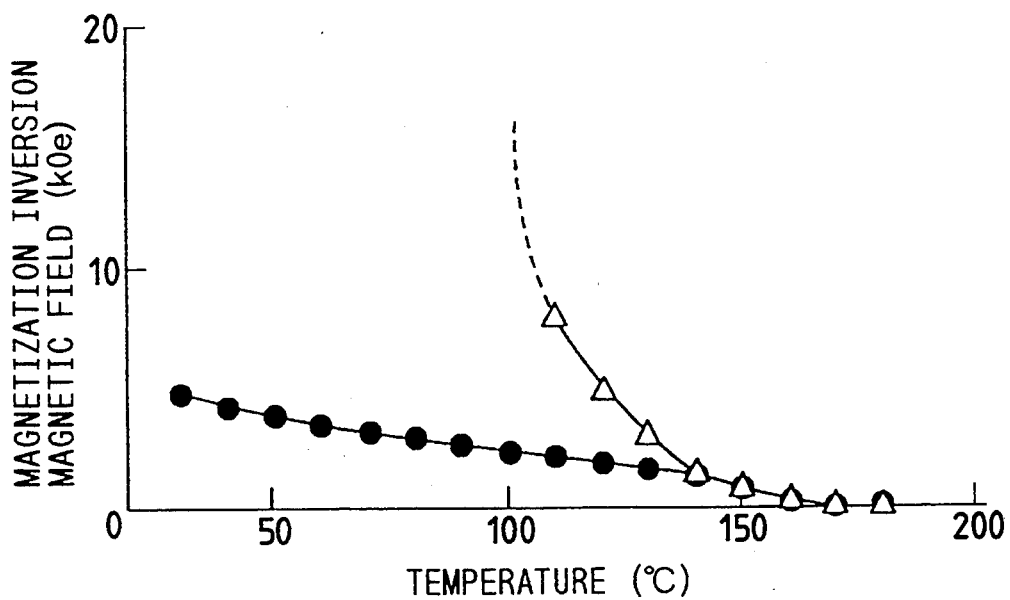
FIG. 7 is a diagram showing a still further example of the temperature dependency of the magnetization inversion magnetic field of a magneto-optical recording medium used in the magneto-optical recording method of the present invention.

FIG. 7 shows, as a still further example, the temperature dependency of the magnetization inversion magnetic field of each magnetic layer of a recording medium which comprises: a first dielectric layer SiN (refractive index: 2.25; thickness: 516 Å); a first magnetic layer Gd—Fe—Co—Cr (Fe—Co sub-lattice magnetization predominant; saturation magnetization: 50 emu/cm$^3$; thickness: 400 Å); a second magnetic layer Tb—Fe—Co—Cr (Tb sublattice magnetization predominant; saturation magnetization: 100 emu/cm$^3$; thickness: 400 Å); and a second dielectric layer SiN (refractive index: 2.25; thickness: 700 Å).

Figure 8:
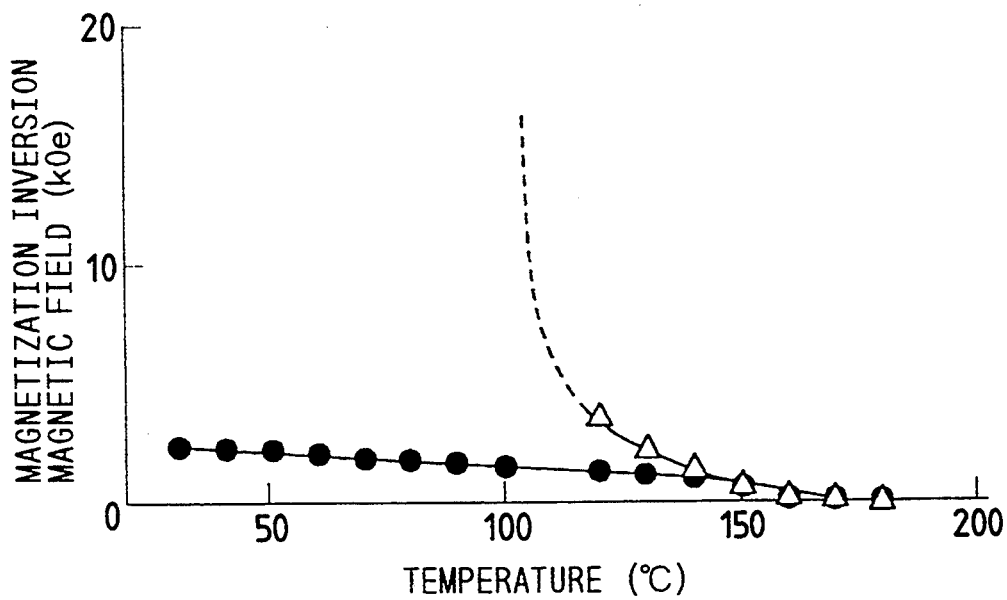
FIG. 8 is a diagram showing a still further example of the temperature dependency of the magnetization inversion magnetic field of a magneto-optical recording medium used in the magneto-optical recording method of the present invention.

FIG. 8 shows, as a still further example, the temperature dependency of the magnetization inversion magnetic field of each magnetic layer of a recording medium which comprises: a first dielectric layer SiN (refractive index: 2.25; thickness: 516 Å); a first magnetic layer Gd—Fe—Co—Cr (Fe—Co sub-lattice magnetization predominant; saturation magnetization: 150 emu/cm$^3$; thickness: 400 Å); a second magnetic layer Tb—Fe—Co—Cr (Tb sub-lattice magnetization predominant; saturation magnetization: 100 emu/cm$^3$; thickness: 400 Å) and a second dielectric layer SiN (refractive index: 2.25; thickness: 700 Å).

Next, a temperature dependency of the magneto-optical effect of each magnetic layer of the recording medium of the present invention will be described.

In the following examples, the Gd—Fe—Co—Cr layer was prepared by simultaneous sputtering using a Gd$_{50}$Co$_{50}$ target and an Fe$_{93}$Co$_4$Cr$_3$ target. The Tb—Fe—Co—Cr layer was prepared by simultaneous sputtering using a Tb target and an Fe$_{93}$Co$_4$Cr$_3$ target.

The Curie temperature of the Tb—Fe—Co—Cr layer is approximately 160° C., and the estimated Curie temperture of the Gd—Fe—Co—Cr layer is 300° C. or more.

In a recording medium used in the magneto-optical recording method of the present invention, the temperature dependent changes in the magneto-optical effect thereof is important as well as the temperature dependent changes in the magnetization inversion magnetic fields of the magnetic layers.

Figure 9:
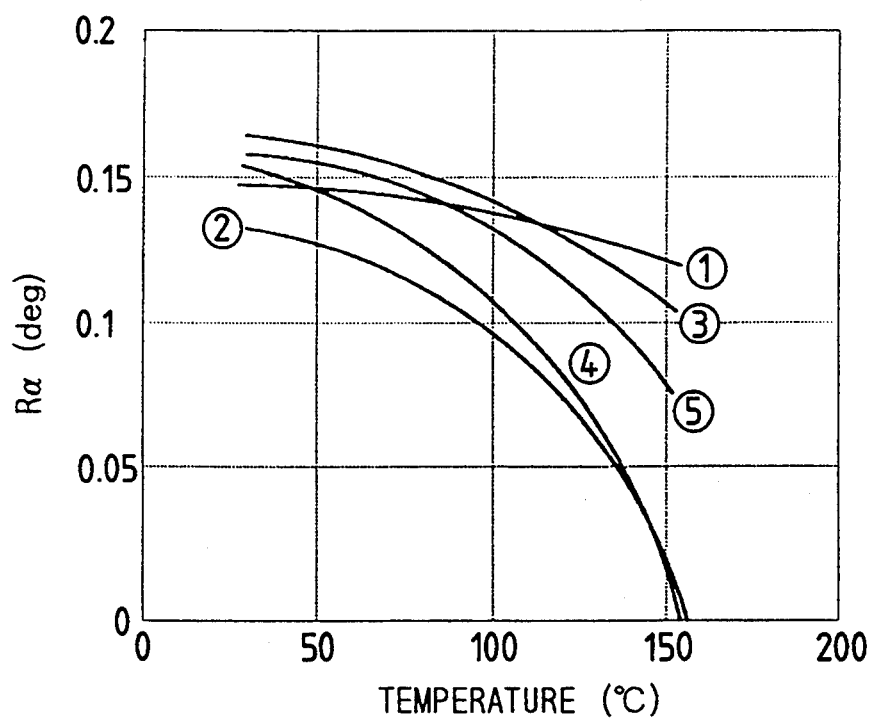
FIG. 9 is a diagram showing an example of the temperature dependency of the magneto-optical effect of a magneto-optical recording medium used in the magneto-optical recording method of the present invention and the temperature dependency of the magneto-optical effect of another magneto-optical recording medium.

FIG. 9 ① shows the temperature dependency of the magneto-optical effect of a recording medium of the composition of Example 1 which comprises: a first dielectric layer SiN (refractive index: 2.3; thickness: 750 Å); a first magnetic layer Gd—Fe—Co—Cr (Fe—Co sub-lattice magnetization predominant; saturation magnetization: 100 emu/cm$^3$; thickness: 300 Å); a second magnetic layer Tb—Fe—Co—Cr (Fe—Co sub-lattice magnetization predominant; saturation magnetization: 200 emu/cm$^3$; thickness: 500 Å); and a second dielectric layer SiN (refractive index: 2.3; thickness: 700 Å). Here, symbol R indicates the intensity reflectivity of light and $\alpha$ is expressed by $\alpha = (\theta_K^2 + \gamma_K^2)^{\frac{1}{2}}$ ($\theta_K$: Kerr rotation angle; $\gamma_K$: Kerr ellipticity).

FIG. 9 ② shows, by way of comparison, the temperature dependency of the magneto-optical effect of a recording medium which comprises: a first dielectric layer SiN (refractive index: 2.3; thickness: 750 Å); a magnetic layer Tb—Fe—Co—Cr (Fe—Co sub-lattice magnetization predominant; saturation magnetization: 200 emu/cm$^3$; thickness: 800 Å); and a second dielectric layer SiN (refractive index: 2.3; thickness: 700 Å). With example ②, R$\alpha$ decreases monotonously toward the Curie temperature of the Tb—Fe—Co—Cr layer which is approximately 160° C. At the Curie temperature (that is, the recording temperature), R$\alpha$ is 0. With such a medium, it is impossible to perform recording check at the time of recording by using a reflected light of the recording light beam, as shown in FIG. 2.

FIG. 9 ③ shows, as another example, the temperature dependency of the magneto-optical effect of a recording medium (of the composition of Example 3) which comprises: a first dielectric layer SiN (refractive index: 2.0; thickness: 1020 Å); a first magnetic layer Gd—Fe—Co—Cr (Fe—Co sub-lattice magnetization predominant; saturation magnetization: 100 emu/cm$^3$; thickness: 100 Å); a second magnetic layer Tb—Fe—Co—Cr (Fe—Co sub-lattice magnetization predominant; saturation magnetization: 200 emu/cm$^3$; thickness: 100 Å); a second dielectric layer SiN (refractive index: 2.0; thickness: 300 Å); and a metal layer Al—Cr (thickness: 450 Å).

FIG. 9 ④ shows, by way of comparison with FIG. 9 ③, the temperature dependency of the magneto-optical effect of a recording medium which comprises: a first dielectric layer SiN (refractive index: 2.0; thickness: 1020 Å); a magnetic layer Tb—Fe—Co—Cr (Fe—Co sub-lattice magnetization predominant: saturation magnetization: 200 emu/cm$^3$; thickness: 200 Å); a second dielectric layer SiN (refractive index: 2.0; thickness: 300 Å); and a metal layer Al—Cr (thickness: 450 Å). Also with this example, R$\alpha$ is 0 at the Curie temperature (i.e. recording temperature). That is, the object of the present invention cannot be attained with this medium.

FIG. 9 ⑤ shows, as another example, the temperature dependency of the magneto-optical effect of a recording medium (of the composition of Example 3) which comprises: a first dielectric layer SiN (refractive index: 2.3; thickness: 940 Å); a first magnetic layer Gd—Fe—Co—Cr (Fe—Co sub-lattice magnetization predominant; saturation magnetization: 150 emu/cm$_3$; thickness: 100 Å); a second magnetic layer Tb—Fe—Co—Cr (Fe—Co sub-lattice magnetization predominant; saturation magnetization: 200 emu/cm$^3$; thickness: 200 Å); a second dielectric layer SiN (refractive index: 2.3; thickness: 300 Å); and a metal layer Al—Cr (thickness: 450 Å).

From the above description, it may be concluded that a magneto-optical recording medium applicable to the present invention should comprise a first magnetic layer which exhibits low coercive force at room temperature and high Curie temperature and a second magnetic layer which exhibits a lower Curie temperature lower and a higher coercive force as compared to those of the first magnetic layer, with the first and second magnetic layers being exchange-coupled to each other.

[Experimental Example 1]

Using the recording medium of FIG. 9 ⑤, an experiment was conducted by the method shown in FIG. 1.

Figure 10:
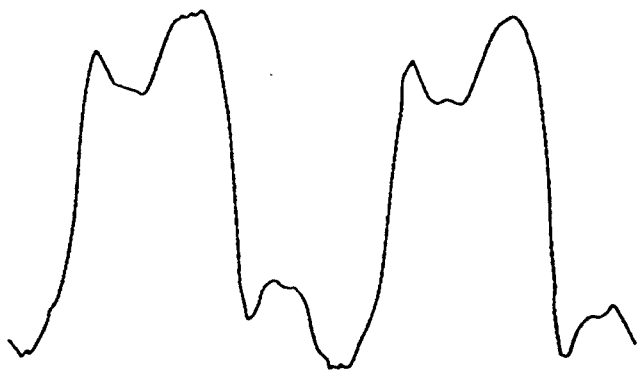
FIG. 10 is a diagram showing the detection waveform of a reflected light of a recording light beam at the time of recording by the magneto-optical recording method of the present invention.

By using an evaluation apparatus of a laser wavelength of 780 nm and a lens numerical aperture of 0.53, a signal of 3 MHz was recorded at a position corresponding to a disc radius of 32 mm, with a laser power of 5 mW and at a substrate rotating speed of 1800 rpm. After that, while recording a signal of 1 MHz, a reflected light thereof was detected and observed, with the result that a signal waveform as shown in FIG. 10 was obtained. As can be seen, the signal of 1 MHz was clearly reproduced, although it involved an intrusion of the signal of 3 MHz.

Figure 11:
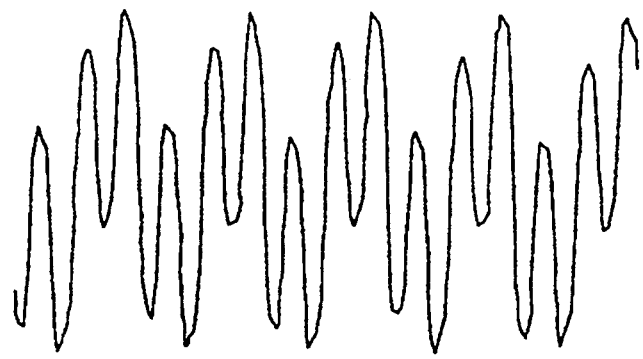
FIG. 11 is a diagram showing the detection waveform of a reflected light of a recording light beam at the time of recording by the magneto-optical recording method of the present invention.

Next, after recording the signal of 1 MHz, a signal of 3 MHz was recorded, and, while doing so, a reflected light thereof was detected and observed, obtaining a signal having a waveform as shown in FIG. 11. It will be seen that the signal of 3 MHz was clearly reproduced although there had been an intrusion of the 1 MHz signal.

Next, a magneto-optical recording medium which is still more suitable for use in the magneto-optical recording method of the present invention will be described.

The magneto-optical recording medium described below has an advantage that it involves little crosstalk of old data to the reflected light (the reproducing light) from the recording medium monitored at the time of recording.

Here, a description will be given of the influence of the crosstalk of old data to the reflected light from the recording medium monitored at the time of recording in the magneto-optical recording method of the present invention.

Figure 12A:
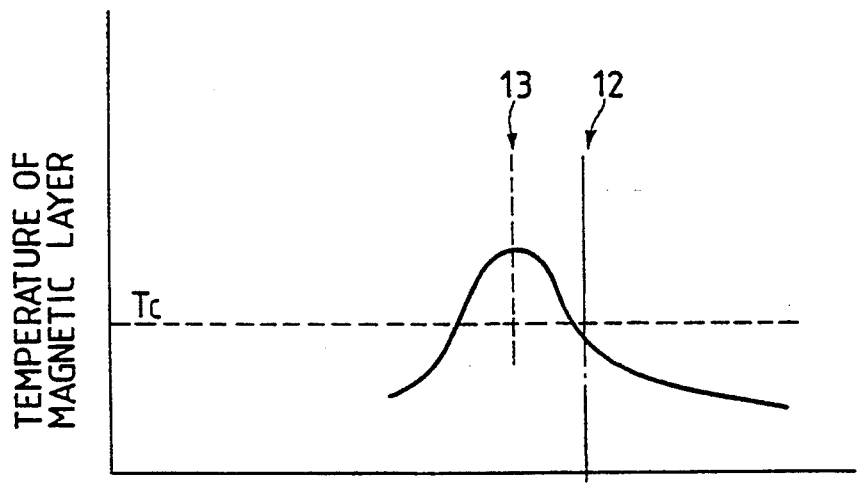
FIGS. 12A through 12C are detailed views of the laser beam irradiation section shown in FIG. 1.
Figure 12B:
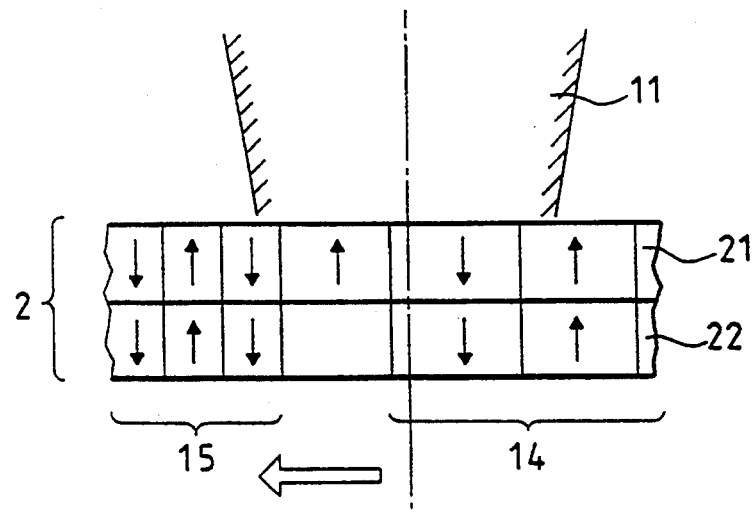

FIG. 12B is a detailed view of the section of the recording medium shown in FIG. 1 where recording is performed.

Figure 12C:
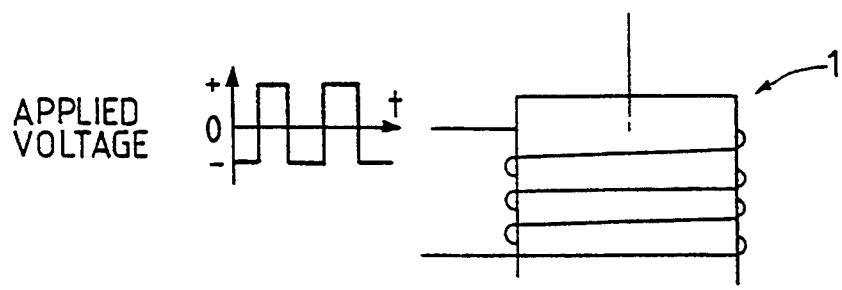

In FIGS. 12A through 12C, the components which are the same as those of FIG. 1 are referred to by the same reference numerals, and a description of such components will be omitted here.

Numeral 11 indicates a laser beam; numeral 12, the central axis (the optical axis) of the laser beam; numeral 13, the maximum temperature point of the section of the recording medium undergoing an increase in temperature; numeral 14, old data; and numeral 15, new data that is being recorded.

Usually, the intensity of a laser beam exhibits a kind of Gaussian distribution, in which the intensity is maximum at the center; the farther from the center, the less the intensity. Accordingly, when the recording medium is scanned by continuously irradiating it with such a laser beam, the maximum temperature point of the recording medium undergoing a temperature rise due to the laser beam is the position indicated at 12 in FIG. 12, which is to the rearward of the central axis of the laser beam with respect to the scanning direction, taking into account the heat energy accumulation in the sections already scanned. In this case, the section of the magnetic domain 22 which is to the rearward of the laser beam irradiating position (with respect to the scanning direction) has reached the Curie temperature Tc, and the magnetization in that section has disappeared. If, in this condition, an external magnetic field corresponding to the recording information is applied to the magnetic domain 21, the information of the magnetic domain 21 assumes a direction of magnetization based on the new data. However, the section of the magnetic domain 22 which is ahead of the laser beam irradiating position (with respect to the scanning direction) does not reach the Curie temperature, and the old data remains there even when the external magnetic field from the coil 1 is applied thereto.

That is, if reproduction signal detection is performed on the basis of the reflected light of the laser beam 11 at this time, the signal detected will include the information of the old data superimposed thereon. This is the influence of the old data crosstalk.

To overcome this problem, the magneto-optical recording medium of the present invention includes a thin film layer which is provided between the second magnetic layer and the dielectric layer provided thereon and which is made of a material having a heat conductivity that is higher than those of the second magnetic layer and the dielectric layer.

Due to this arrangement, heat is quickly transmitted to the first and second magnetic layers along the rotating direction of the recording medium when the laser beam is continuously applied thereto at the time of recording, and, in the section which is irradiated with the laser beam, the temperature distribution in the second magnetic layer is uniform, and the old data is caused to disappear by the external magnetic field in accordance with the information to be recorded. Therefore, the reflected light is free from the influence of crosstalk from the old data.

It is desirable that the thin film layer be made of a metal having a high heat conductivity so that the heat generated by the absorption of the laser beam can be prevented from being transmitted to the metal layer used as the reflecting layer and that this heat can be quickly transmitted to the second magnetic layer. Examples of the metal having high heat conductivity include Cu, Au, Ag and Al. To avoid corrosion of the first and second magnetic layers, it is desirable to adopt a metal which is electro-chemically baser (i.e., which has a stronger ionization tendency) as compared with the first and second magnetic layers. From this viewpoint, it is desirable to adopt Al. Since, however, pure Al is subject to crystallization, an Al alloy containing an element such as Ti, Cr or Ta may be adopted instead.

In the case when Al is used as the material of the thin film layer, a film thickness of 70 Å or more would involve an increase in the elliptic polarization of the reflected light, that is, an increase in phase difference, resulting in an increase in the C/N ratio dispersion due to the drive device. Further, that would involve an excessive increase in the reflectivity of this thin film layer, resulting in a deterioration in recording sensitivity. With a film thickness of 20 Å or less, on the other hand, an improvement in heat conduction cannot be attained. Thus, when using Al for the thin film layer, it is desirable that the film thickness be 20 to 70 Å. The thickness should be determined within this range taking into account the phase difference, sensitivity, the degree of improvement in the temperature distribution in the second magnetic layer, etc.

Figure 13:
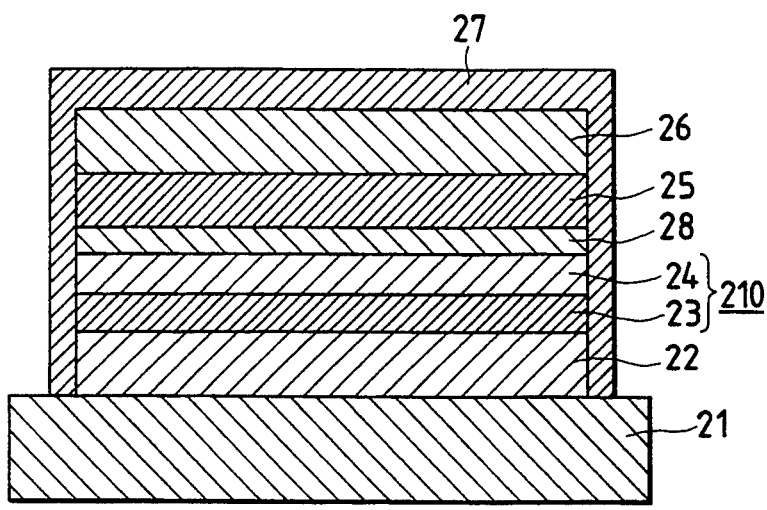
FIG. 13 is a schematic sectional view of the construction of a magneto-optical recording medium suitable for use in the magneto-optical recording method of the present invention.

The magneto-optical recording medium of the present invention will be described in more detail with reference to FIG. 13.

The magneto-optical recording medium of the present invention has an exchange-coupled two layered structure with a reflecting film. It includes an optically transparent substrate 21 made of glass, plastic or the like. Successively provided on this substrate are: an under-coat layer 22 made of an inorganic dielectric substance, such as $SiN_x$, for obtaining an interference effect and anti-corrosion effect; a first magnetic layer 23 participating in reproduction; a second magnetic layer 24 participating in reproduction and having a higher coercive force and a lower Curie temperature as compared with the first magnetic layer 23; a thin-film layer 28 made of aluminum; an interference layer 25 made of a dielectric substance such as $SiN_x$ for preventing corrosion of the magnetic layers 23 and 24 and obtaining an interference effect; and a metal reflective layer 26 constituting a reflective film. The first and second magnetic layers 23 and 24 are adjacent to each other and exchange-coupled to each other, forming an exchange-coupled two-layered film 210. The heat conductivity of the aluminum thin film layer 28 is higher than those of the second magnetic layer 24 and the interference layer 25. The layers 22 through 26 are continuously formed by vacuum film formation without breaking the vacuum. A protective coating film 27 consisting of an ultraviolet-radiation curing resin is provided in such a way as to cover the entire surface of the section of the substrate 21 where the layers 22 through 25 are provided.

[Experimental Example 2]

A sample of a magneto-optical recording medium was prepared in the following manner: A substrate 21 of polycarbonate having a diameter of 130 mm which had undergone pre-grooving was prepared. By using a magnetron sputtering apparatus, the following layers were successively formed on the substrate without breaking the vacuum: an under-coat layer 22 having a thickness of 1200 Å and made of SiN for obtaining an oxidation preventing effect and interference effect; a first magnetic layer 23 having a thickness of 100 Å and made of Gd—Fe—Co; a second magnetic layer 24 having a thickness of 100 Å and made of Tb—Fe—Co; an aluminum thin film layer 28 having a thickness of 30 Å for improving the temperature distribution of the magnetic layers 23 and 24; an interference layer 25 having a thickness of 450 Å and made of SiN for enhancing the oxidation preventing effect and enhancing interference effect; and a metal reflective layer 26 made of aluminum.

Using the sample thus prepared, a signal having a frequency of 1 MHz was recorded at a position on the medium corresponding to a radius of 30 mm by continuously irradiating the sample with a laser beam and modulating the external magnetic field in accordance with the recording information, at the rotating speed of 1500 rpm. Afterwards, a signal having a frequency of 5 MHz was recorded in the same way. Simultaneously with this recording, the reflected light from the recording medium was monitored. Upon detection of the reproduction signal, it was found that the signal component of a frequency of 1 MHz corresponding to the old data had been reduced by −20 dB as compared with the prior art.

[Experimental Example 3]

A sample of a magneto-optical recording medium was prepared in the following manner: a substrate 21 of polycarbonate having a diameter of 130 mm which had undergone pre-grooving was prepared. By using a magnetron sputtering apparatus, the following layers were successively formed on the substrate without breaking the vacuum: an under-coat layer 22 having a thickness of 1100 Å and made of SiN for obtaining an oxidation preventing effect and an interference effect; a first magnetic layer 23 having a thickness of 100 Å and made of Gd—Fe—Co; a second magnetic layer 24 having a thickness of 200 Å and made of Tb—Fe—Co; an aluminum thin film layer 28 with a thickness of 50 Å for improving the temperature distribution of the magnetic layers 23 and 24; an interference layer 25 having a thickness of 300 Å and made of SiN for enhancing the oxidation preventing effect and interference effect; and a metal reflective layer 26 made of aluminum.

Using the sample thus prepared, a singal having a frequency of 1 MHz was recorded at a position corresponding to a radius of 30 mm by continuously irradiating the sample with a laser beam and modulating the external magnetic field in accordance with the recording information, at the rotating speed of 1500 rpm. Afterwards, a signal having a frequency of 5 MHz was recorded in the same way. Simultaneously with this recording, the reflected light from the recording medium was monitored. Upon detection of the reproduction signal, it was found that the signal component of a frequency of 1 MHz corresponding to the old data had been reduced by −20 dB as compared with the prior art.

In the First Embodiment, described above, the first magnetic layer (the reproducing layer) and the second magnetic layer (the recording layer) may have, apart from Curie temperatures, magnetic compensating temperatures. In that case, however, the relationship between the first and second magnetic layers should be as follows:

Assuming that the lower of the Curie temperature and the magnetic compensating temperature is a zero magnetization temperature, the first magnetic layer has a higher zero magnetization temperature and a lower coercive force, as compared with the second magnetic layer.

[Second Embodiment]

Next, another embodiment of the magneto-optical recording method of the present invention will be described.

In the following, a second embodiment of the present invention will be described in detail with reference to the drawings. FIGS. 14A and 14B are diagrams showing an embodiment of the magneto-optical recording medium of the present invention. In the drawing, numeral 31 indicates a transparent substrate formed of a material having a light transmitting property, such as glass or plastic. Successively formed on the transparent substrate 31 are: a protective layer 32, a first magnetic layer (a reproducing layer) 33, a third magnetic layer (an adjusting layer) 34, a second magnetic layer (a recording layer) 35, a protective layer 36, and a reflective layer 37. The reproducing layer 33 and the recording layer 35 are exchange-coupled to each other, and the adjusting layer 34 provided therebetween has the function of controlling the exchange-coupling force according to the laser beam temperature. Numeral 38 indicates an objective lens for laser beam condensation needed when actually performing recording and reproduction; and numeral 39 indicates a magnetic head opposed thereto.

Figure 15:
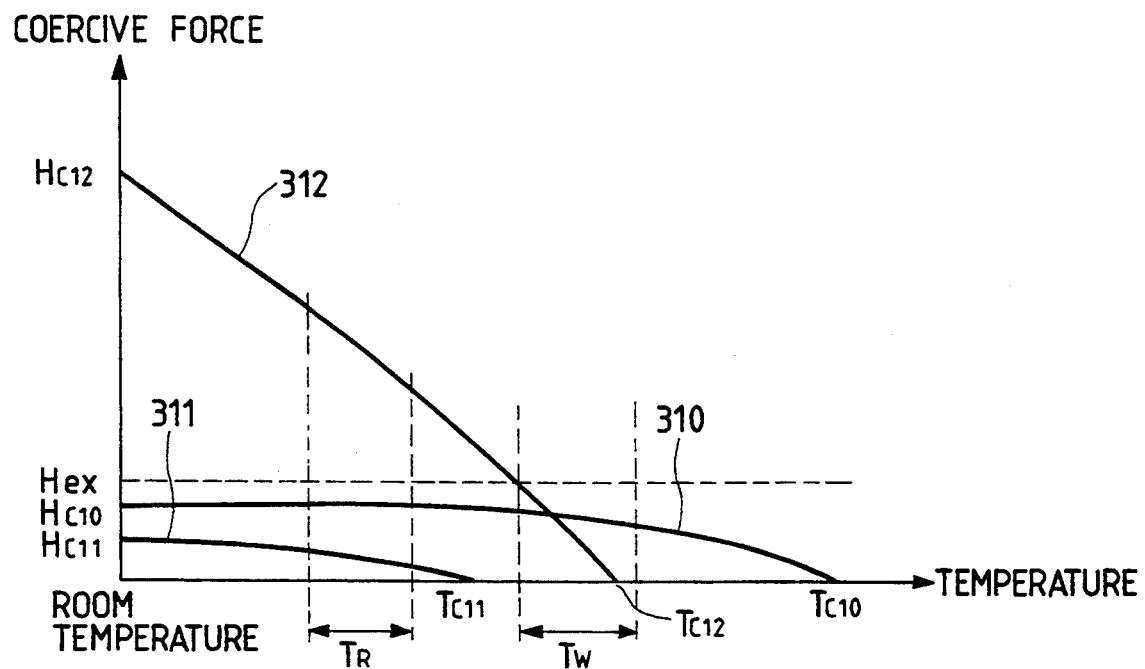
FIG. 15 is a diagram showing the respective characteristics of the magnetic layers of the magneto-optical recording medium shown in FIG. 14.

FIG. 15 is a characteristic diagram showing the relationship between temperature and coercive force in each of the above magnetic layers. Numeral 310 indicates a characteristic curve of the reproducing layer 33; numeral 311, a characteristic curve of the adjusting layer 34; and numeral 312 a characteristic curve of the recording layer. As can be clearly seen from FIG. 15, the reproducing layer 33 exhibits a low coercive force $H_{C10}$ at room temperature and high Curie temperature $T_{C10}$. The recording layer 35 exhibits a greater coercive force $H_{C12}$ at room temperature and a lower Curie temperature $T_{C12}$ as compared with the reproducing layer 33. The coercive force $H_{C11}$ at room temperature and the Curie temperature $T_{C11}$ of the adjusting layer 34 are both lower than those of the other layers. In the drawing, symbol $T_R$ indicates the temperature range of the section of the magnetic layer in the vicinity of the light spot at the time of reproduction, which is higher than room temperature and lower than the Curie temperature of the adjusting layer 34. Symbol $T_W$ indicates the temperature range of the section of the magnetic layer in the vicinity of the light spot at the time of recording, which is close to the Curie temperature $T_{C12}$ of the recording layer 35, higher than the Curie temperature $T_{C11}$ of the adjusting layer 34, and lower than the Curie temperature $T_{C10}$ of the reproducing layer 33. Table 1 shows specific compositions, film thicknesses, and other characteristics of layers of the magneto-optical recording medium of this embodiment.

the time of reproduction, the anisotropy constant of the adjusting layer is larger than the value of $2\pi Ms^2$ at that temperature, so that the adjusting layer 34 exhibits a vertical magnetization. As a result, the exchange-coupling force between the reproducing layer 33 and the recording layer 35 is augmented, and the direction of magnetization recorded on the recording layer 35 can be transferred to the reproducing layer 33. Further, when the temperature of the magnetic layer has risen to the temperature range $T_W$ at the time of recording, the temperature of the adjusting layer 34 becomes equal to or higher than the Curie temperature $T_{C11}$, so that the magnetization disappears. As a result, the exchange-coupling force between the reproducing layer 33 and the recording layer 35 is cut off. When an external modulation magnetic field $\pm H_{ex}$ larger than the coercive force of the reproducing layer 33 is applied, the magnetization of the reproducing layer 33 is directed in the direction of the external modulation magnetic field.

Here, the method of recording and reproducing information with respect to the above-described magneto-optical recording medium will be described in detail with reference to FIGS. 16A through 17B$_2$. First, regarding the optical head and the magnetic head needed for information recording, ones equivalent to those shown in FIG. 1 are used here. FIG. 16A is a plan view of a part of the magneto-optical recording medium, and FIGS. 16B, and 16B$_2$ are diagrams showing the magnetizing conditions in the magnetic layers. In the drawings, numeral 313 indicates a track on the magneto-optical recording medium on which information is recorded. It is assumed here that the magneto-optical recording medium is moving in the direction indicated by the arrow A. Numeral 314 (314') indicates a record-

TABLE 1

|  | Composition | Thickness | Curie temp. | Coercive force | Saturation magnetization (Ms) |
|---|---|---|---|---|---|
| Reproducing layer 33 | GdFeCo | 300 Å | ≈400° C. | ≈0.1kOe TM-rich | ≦200 emu/cc |
| Adjusting layer 34 | GdFeCo | 100 Å | ≈140° C. | RE-rich | 300~400 emu/cc |
| Recording layer 35 | TbFeCo | 400 Å | ≈250° C. | >10kOe | RE-rich +200 emu/cc~ TM-rich −200 emu/cc |

As shown in Table 1, the reproducing layer 33 has a composition, for example, of TM-rich, and its Ms (saturation magnetization) is 200 emu/cc or less. The adjusting layer 34 has a composition, for example, of RE-rich, and its Ms is approximately 300 to 400 emu/cc. The recording layer 35 has a composition, for example, of RE-rich or TM-rich, and its Ms is 200 emu/cc or less, and −200 emu/cc or more.

Next, the exchange-coupling force between the reproducing layer 33 and the recording layer 35 and the function of the adjusting layer 34 will be explained. First, at a temperature below the temperature range $T_R$ at the time of reproduction, the Ms of the adjusting layer 34 is large and the value of $2\pi Ms^2$ is larger than the anisotropy constant, so that the adjusting layer 34 does not exhibit a vertical magnetization but an in-plane magnetization. As a result, the exchange-coupling force between the reproducing layer 33 and the recording layer 35 is weakened. That is, when an external magnetic field $H_{ex}$ which is larger than the coercive force of the reproducing layer 33 is applied, the magnetization of the reproducing layer 33 is directed in the direction of the external magnetic field. When the temperature of the magnetic layer rises to the temperature range $T_R$ at ing light beam spot applied to the track 313, that is, the area irradiated with the light beam at the time of recording. This light beam spot is obtained by converging a laser beam from a light source such as a semiconductor laser by an objective lens 38 shown in FIG. 14A. The temperature of the magnetic layer is raised by the light beam spot 314. Numeral 316 indicates an exchange-coupling force cut-off (blocked) area which is in the temperature range of $T_W$ shown in FIG. 15. Within the exchange-coupling force cut-off area 316, the magnetization of the adjusting layer 34 disappears, and the exchange-coupling force between the reproducing layer 33 and the recording layer 35 is cut off. Numeral 315 (315') indicates an area on the high temperature side of the temperature range of $T_W$. This is a recordable area which allows inversion of the magnetization of the recording layer 35 by the external modulation magnetic field $\pm H_{ex}$ applied from the magnetic head 39 shown in FIG. 14A.

Information recording is performed by applying the light beam spot 314, which has a constant power capable of causing the temperature of the recording medium to rise to a temperature within the temperature range $T_W$, while performing scanning therewith, thereby forming the recordable area 315 and the exchange-coupling force cut-off area 316, which includes the light beam spot 314 and the recordable area 315. In this condition, the external magnetic field is modulated by the magnetic head 39 to $+H_{ex}$ or $-H_{ex}$ in accordance with the information to be recorded, and this magnetic field is applied to an area substantially including the exchange-coupling force cut-off area 316. As a result, a magnetic domain is recorded in the recordable area 315 of the recording layer 35. The magnetic domain overwritten has a configuration like the feathers of an arrow. That is, since, as shown in FIG. 16B, new information is overwritten, for example, on the magnetic domain 317-1 of the previous information, the front and rear end portions of the magnetic domain 317-2 of the new information are shaped arc-like to define a configuration like the feathers of an arrow. In this case, it is possible to make the length in the direction A of the magnetic domain to be recorded approximately half the radius of the light beam spot 314 by making the modulation frequency of the external magnetic field high. On the other hand, the magnetization of the section of the reproducing layer 33 which is in the exchange-coupling force cut-off area 316 changes its direction in accordance with the modulation of the external magnetic field. That is, it is oriented in the same direction as the magnetic domain overwritten on the recording layer 35. This makes it possible to detect the direction of magnetization of the reproducing layer 33 by detecting the polarization condition of the reflected light from the magneto-optical recording medium by means of the reproduction optical system of the optical head. That is, it is possible to check whether the magnetic domain has been erroneously written due to any defects of the magnetic layer or the like, so that the recording information can be checked simultaneously with the recording by one light beam spot. In this case, the old data does not exist within the area of the light beam spot 314, so that the reflected light is free from the influence of the crosstalk of the old data.

Further, an explanation of the method of reproducing recorded information on the above magneto-optical recording medium will be given as a supplement. FIG. 17A is a plan view of a part of the magneto-optical recording medium, and FIGS. 17B₁ and 17B₂ are diagrams showing the magnetizing conditions in the magnetic layers. In the drawings, numeral 313 indicates a track on the magneto-optical recording medium on which information is recorded. It is assumed that the magneto-optical recording medium is moving in the direction indicated by the arrow A. Numeral 318 (318') indicates an area to which a reproducing light beam spot having a power lower than that of the recording light beam is applied. This light beam spot 318 causes the temperature of the magnetic layer to rise. Numeral 319 (319') indicates a transferable area which is in the temperature range $T_R$ shown in FIG. 15. Within the transferable area 319, the adjusting layer 34 exhibits a vertical magnetization to enhance the exchange-coupling force between the reproducing layer 33 and the recording layer 35, so that the direction of magnetization of the recording layer 35 is transferred as the direction of magnetization of the reproducing layer 33, without being affected by the external magnetic field applied by the magnetic head 39. Numeral 320 (320') indicates an intransferable area which is outside the transferable area 319 and which includes the light beam spot 318. The temperature of the section of the magnetic layer in the intransferable area 320 is below the temperature range $T_R$.

Within this area 320, the adjusting layer 34 exhibits an in-plane magnetization, so that the exchange-coupling force between the reproducing layer 33 and the recording layer 35 is weakened. Accordingly, the direction of magnetization of the reproducing layer 33 follows the direction of the external magnetic field due to the magnetic head 39, irrespective of the direction of magnetization of the recording layer 35. At this time, the magnetic head 39 applies an external magnetic field which is in a predetermined direction.

Thus, in reproduction, the transferable area 319 and the intransferable area 320 are formed by applying the light beam spot 318 which has a constant power lower than that for recording and which is capable of causing the temperature of the recording medium to rise to a temperature within the temperature range $T_R$, while performing scanning with the beam spot. In this condition, an external magnetic field which is in a fixed direction is applied to an area substantially including the intransferable area 320. The direction of the external magnetic field may be the same as the direction of magnetization of the recording layer 35 at the time of initialization, or reverse to that. As a result, those sections of the magnetic domain 321 on the track 313 which are within the intransferable area 320, indicated at 321-2 and 321-4, and the part of the section 321-3 which is indicated by broken lines are masked, and it is only the part of the section 321-3 which is within the transferable area 319, indicated by solid lines, that contributes to changes in the polarizing condition of the reproducing reflected light. Accordingly, by detecting this reflected light by the reproduction optical system of an optical head as shown in FIG. 1 and detecting the polarizing condition thereof, it is possible to detect the direction of the magnetic domain within the transferable area 320 of the reproducing layer 33 and reproduce a magnetic domain having a length equal to or smaller than the diameter of the light beam spot 318. By making the transferable area 319 still smaller, it might be possible to reproduce a magnetic domain having a still smaller length. However, when taking the C/N ratio of the reproduction signal into consideration, it is desirable to make the size of the transferable area 319 approximately half the size of the reproducing light beam spot 318.

Figure 18A:
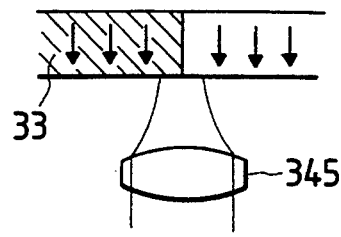
FIGS. 18A and 18B are diagrams showing the magnetization of the reproducing layer at the time of information reproduction with respect to transferable and masked regions.
Figure 18B:
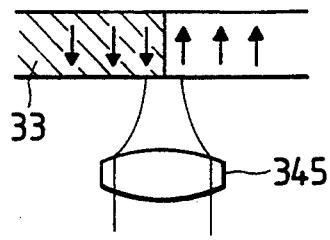

The reproduction method will be further explained. To simplify the explanation, it will be assumed here that half the light beam spot 318 is masked. With reference to FIGS. 18 and 19, it will be described how the phase distribution and intensity distribution of the reflected light will be influenced depending upon whether or not the direction of magnetization in the transferable area 319 is the same as the direction of magnetization of the masked area. FIG. 18 shows the reproducing layer 33 and the objective lens 38 inside the optical head. The hatched section of the reproducing layer 33 (the section which influences the left half of the light-beam spot) represents a masked area. Here, it is fixed as a downward magnetization. The remaining section of the reproducing layer 33 (the section which influences the right half of the light beam spot) is a transferable area. FIG. 18A illustrates the case where a magnetization in the same direction as the masked area is transferred, and FIG. 18B illustrates the case where a magnetization in a direction different from that of the masked area is transferred. FIGS. 19A through 19D show the amplitude and intensity distributions of the reflected light in these two cases. Here, it is assumed that the incident light is a linearly polarized light which is polarized in the P-axis direction; the reflected light with respect to downward magnetization is $R_+$ which is rotated by $+\theta_k$ and the reflected light with respect to upward magnetization is $R_-$ which is rotated by $-\theta_k$. Accordingly, the P-axis and S-axis components are expressed as $(P_+, S_+)$ and $(P_+, S_{31})$, respectively.

Figure 19A:
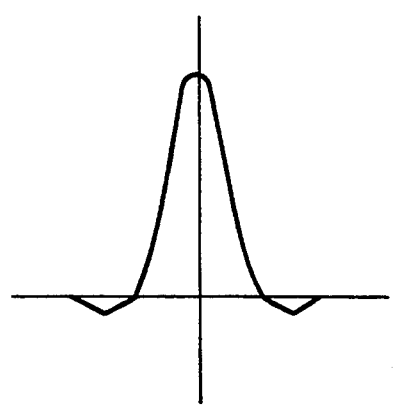
FIGS. 19A to 19D are diagrams showing the amplitude distribution and the intensity distribution of the reflected light, in correspondence with the transferable and masked regions and with respect to the P-axis and the S-axis components.
Figure 19B:
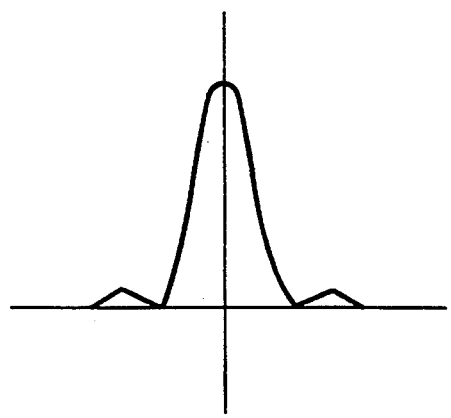
Figure 19C:
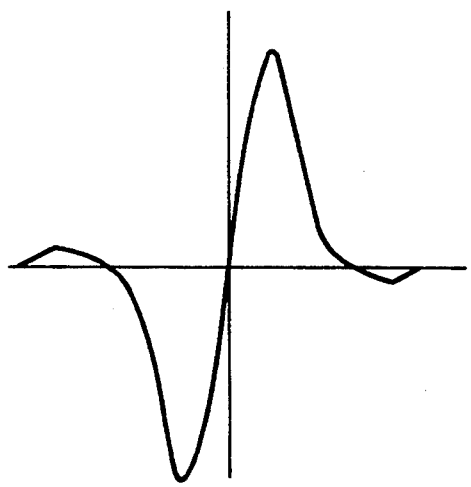
Figure 19D:
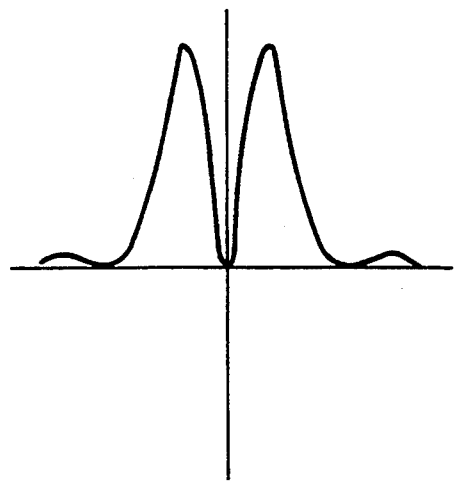

First, the P-axis component will be considered. It substantially remains the same, $P_+$, in both the cases of FIGS. 18A and 18B. Accordingly, the distribution of amplitude of the reflected light (ignoring the size to consider the configuration only) is as shown in FIG. 19A and the distribution of the intensity of the reflected light (ignoring the size to consider the configuration only) is as shown in FIG. 19B. Thus, they are substantially the same. Next, regarding the S-axis component, it is a uniform distribution of $S_+$ in the light beam spot in FIG. 18A, so that the distribution of the amplitude of the reflected light (ignoring the size to consider the form only) and the distribution of the intensity of the same (ignoring the size to consider the form only) are as shown in FIGS. 19A and 19B, as in the case of the P-axis component. In FIG. 18B, however, the boundary of the magnetic domains is inside the light beam spot, so that there exist two components, $S_+$ and $S_-$ which are components which have the same size and the phase of which are shifted relative each other by $\pi$. The distribution of amplitude (ignoring the size to consider the form only) and the distribution of intensity (ignoring the size to consider the form only) of the reflected light in this case are as shown in FIGS. 19C and 19D.

Figure 20A:
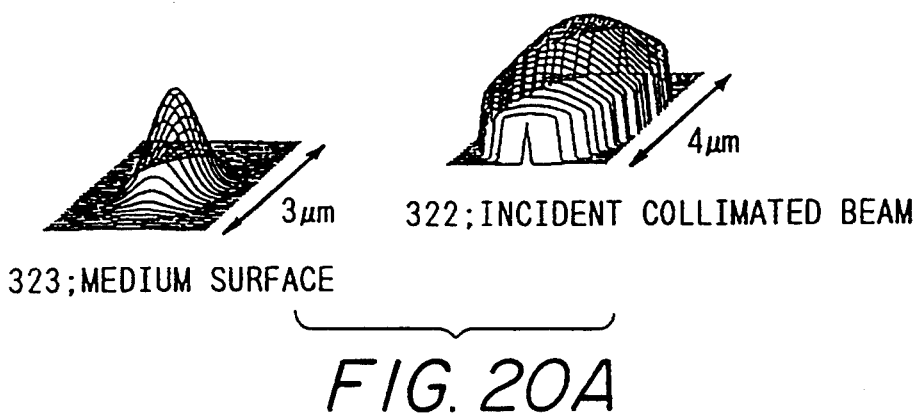
FIGS. 20A through 20C are diagrams showing the light intensity distribution in the collimated beam, on the magneto-optical recording medium surface, and on the photodetector surface when the magnetization of the magneto-optical recording medium is directed entirely downward.
Figure 20B:
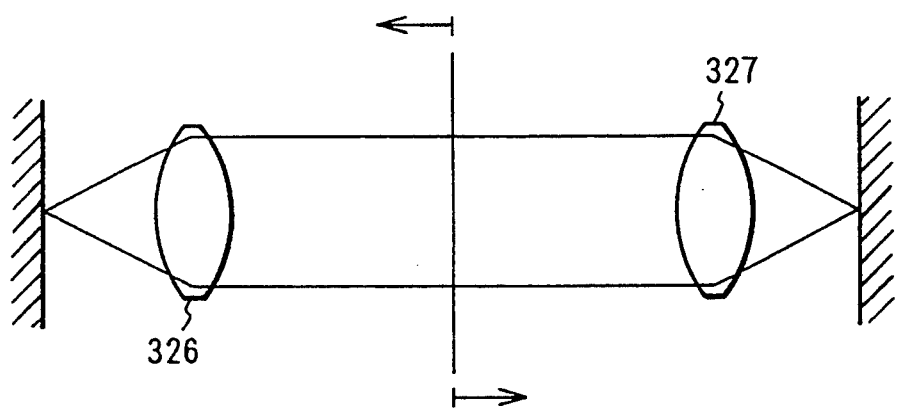
Figure 20C:
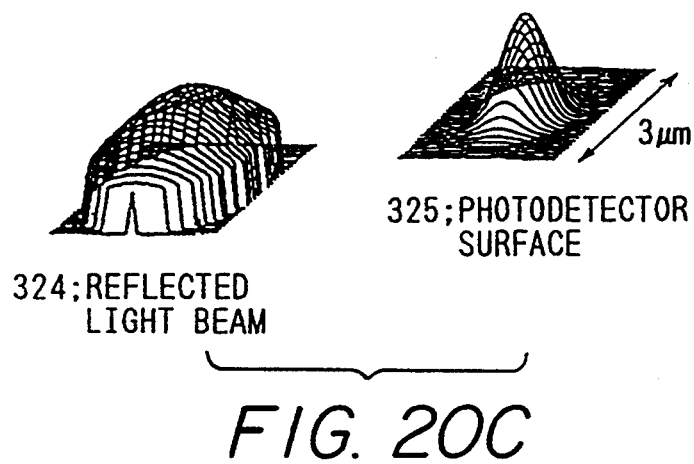

Next, the light of this S-axis component will be described in more detail with reference to FIGS. 20A through 21G$_2$. FIGS. 20A and 20C show the distribution of light intensity on the surface of a magneto-optical recording medium and a photodetector surface of a collimated beam when the entire magneto-optical recording medium exhibits a downward magnetization as shown in FIG. 18A. However, the stereoscopic diagrams presented here are all standardized in terms of maximum values and have no correspondence in size. This also applies to the examples described below. The light emitted from the semiconductor laser of the optical head is transmitted by way of a collimator lens, a beam shaping prism, etc. to become a collimated beam of a Gaussian distribution. Assuming that the diameter of this collimated beam is approximately 6 mm and the diameter of the aperture of the optical head is 4 mm, the incident collimated beam exhibits an intensity distribution as shown by the stereoscopic representation 322. When this collimated beam is converged by the objective lens 326 and applied to the surface of the magneto-optical recording medium as a light beam spot having a diameter of approximately 1 μm, a light intensity distribution as shown by the stereoscopic representation 323 is obtained. The incident collimated beam 322 and the medium surface 323 only generate a light of P-axis component, and no light of S-component has been generated yet. The light reflected by the magneto-optical recording medium undergoes generation of an S-axis component due to the light Kerr effect or the like. In this case, the magneto-optical recording medium exhibits a uniform downward magnetization, so that a light of $S_+$ is generated. The reflected light from the medium surface is again transmitted by way of the objective lens 326 to become a reflected collimated beam. Stereoscopic representation 324 shows the intensity distribution of the reflected collimated beam, in which both the P-axis and S-axis components assume the same form as the incident collimated beam. The reflected collimated beam is converged by the condensing lens 327 and applied to the photodetector surface. Stereoscopic representation 325 shows the light intensity distribution on the photodetector surface. Also in this case, both the P-axis and S-axis components assume the same form as those of the intensity distribution on the medium surface.

FIGS. 21A$_1$ through 21G$_2$ diagrams showing light intensity distributions of the S-axis component on the photodetector surface when the magnetic domain 321 (which exhibits an upward magnetization in this case) is scanned with the light beam spot 318. The light-intensity distributions of the P-axis component are shown in FIGS. 20A through 20C. In FIGS. 21A$_1$ through 21G$_2$, the relative position of the magnetic domain 321 recorded on the track 313 with respect to the reproducing light beam spot applied to the track 313 is varied little by little. The range indicated at 319 is a transferable area, and the range indicated at 320 is an intransferable area. The magnetization of the intransferable area 320 is downward, and the magnetic domain in the area 319 is represented by a hatching of broken lines (321a). The magnetic domain in the transferable area 319 is represented by a hatching of solid lines (321b). The numeric values shown in the drawings are total-light-quantity values. FIG. 21A$_2$ shows a case where the magnetic domain 321 is not in the transferable area 319 (the condition of FIG. 18A). In this case, the light intensity distribution of the S-axis component on the photodetector surface is the same as the one indicated at 325 in FIG. 20C. It is assumed here that the total light quantity at this time is 3100. When the proportion of the magnetic domain 321 in the tranferable area 319 successively increases as shown in FIGS. 21B$_1$ through 21D$_2$, the entire transferable area 319 is eventually occupied by the magnetic domain 321, as shown in FIG. 21E$_1$. This corresponds to the condition of FIG. 18B. Regarding the light intensity distribution, on the other hand, as the proportion of the magnetic domain 321 in the transferable are 319 increases, the peak of the light beam spot is gradually deviated from the center of the optical axis, and a second peak appears on the opposite side of the first peak with respect to the optical axis. In the condition of FIG. 21E$_2$, the light quantities of the two spots are substantially equalized. When the magnetic domain 321 further passes on, the second peak is diminished, as shown in FIGS. 21F$_2$ and 21G$_2$, and the single spot condition of FIG. 21A$_2$ is restored. The total light quantity is gradually diminished and returns to 3100.

Figure 22A:
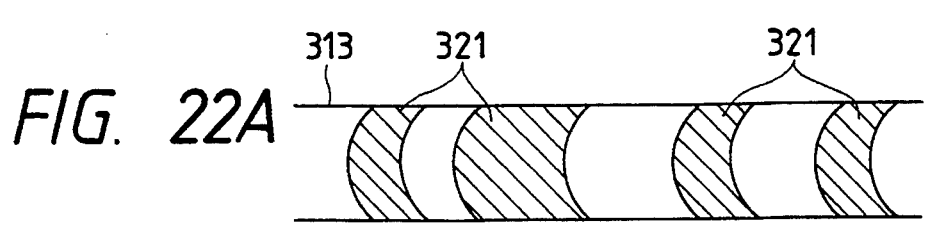
FIGS. 22A to 22C are diagrams showing a magnetic domain on an information track and a reproduced reproduction signal.
Figure 22B:
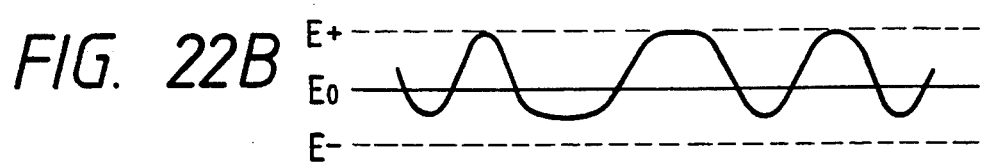

The first peak spot corresponds to $S_+$ and the second peak spot corresponds to $S_-$. By detecting these beams by the reproduction optical system of FIG. 1, a signal as shown in FIG. 22B is obtained. FIG. 22A shows a magnetic domain arrangement on an information track, and FIG. 22B shows a reproduction signal obtained when the magnetic domain is detected by an ordinary reproduction optical system. If the above magnetic domain is reproduced by a conventional reproduction optical system, the light reception of each of the two peaks shown above is effected by a single photodetector, so that the $S_+$ and $S_-$ are cancelled. Further, assuming, in FIG. 22B, that $E_0$ is the reference level, the amplitude of the reproduction signal oscillates up to $E_+$ in the condition where there is no magnetic domain (the condition of FIG. 18A). In the condition in which there is a magnetic domain (the condition of FIG. 18B), the S-axis component is cancelled, so that the amplitude of the reproduction signal does not oscillate up to $E_-$. Of course, it is possible to obtain information from a reproduction signal as shown in FIG. 22B. However, to improve the quality of the reproduction signal, it is desirable to obtain a reproduction signal which is substantially at zero level in a condition when there is no magnetic domain and which has an amplitude of $E_+'$ in a condition where there is a magnetic domain, as shown in FIG. 22C.

Figure 22C:
Figure 23:
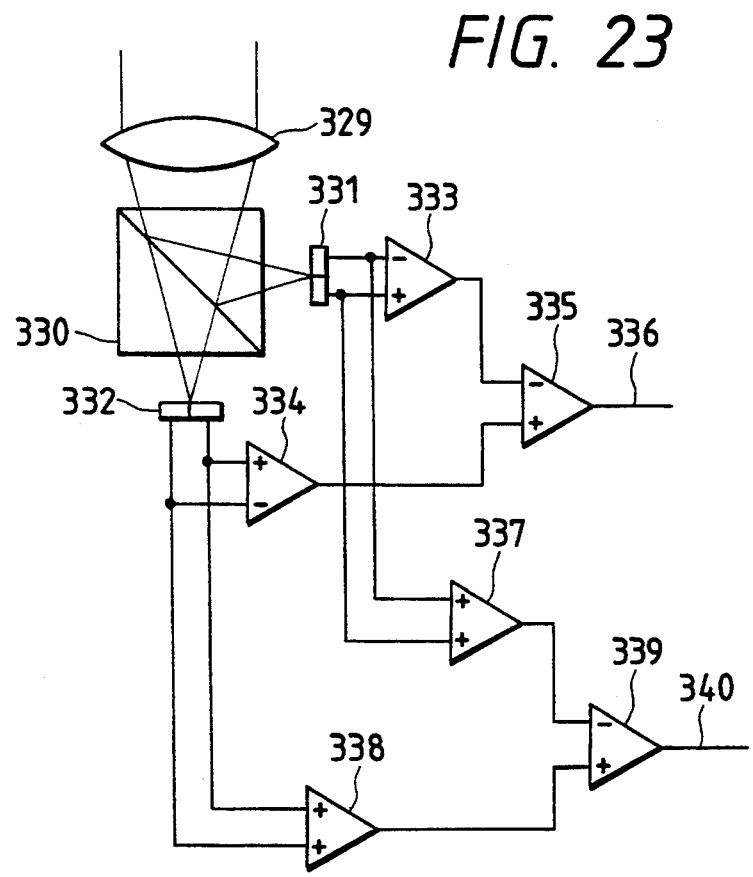
FIG. 23 is a diagram showing an example of an information reproduction system suitable for the recording medium of FIG. 14.

In view of this, an example of an apparatus for obtaining a signal as shown in FIG. 22C will be described with reference to FIGS. 23 and $24A_1$ through $24D_2$. In FIG. 23, numeral 329 indicates a condensing lens, and numeral 330 indicates a polarizing beam splitter. Numerals 331 and 332 indicate a two-divided photodetector, the dividing lines of which are in directions perpendicular to the track of the magneto-optical recording medium. That is, when the track is projected onto the two-divided photodetectors by using the optical head, the dividing lines lie perpendicular to the track. Numerals 333, 334 and 335 indicate amplifiers for differential detection, and numeral 336 indicates a reproduction signal. Numerals 337 and 338 indicate amplifiers for sum signal detection. Through differential detection of each sum signal by means of a differential amplifier, a reproduction signal 340 is obtained. The reproduction signal 340 is equivalent to those obtained by conventional reproduction optical systems. In this embodiment, however, a direct verification at the time of information recording as described above is conducted by using the reproduction signal 340.

FIGS. $24A_1$ through $24D_2$ are diagrams showing intensity distributions obtained on the two-divided photodetector when polarization interference is effected by superimposing a light having a P-axis component on a light having the S-axis component shown in FIGS. $21A_1$ through $21G_2$. FIGS. $24A_1$ and $24B_2$ are related to the two-divided photodetector 331, FIGS. $24C_1$ through $24D_2$ are related to the two-divided photodetector 332. The X-axis of each diagram indicates a position on the two-divided photodetector shown below it, and the Y-axis indicates a magnitude of intensity. The Y-axis is positioned in the dividing line on the two-divided photodetector. Next, when the magnetic domain 321 does not exist in the transferable area 319 (FIG. 18A), the light intensity distributions on the two-divided photodetectors 331 and 332 are as shown in FIGS. $24A_1$, $24A_2$, and $24C_1$ and $24C_2$. At this time, the distribution form in each case is symmetrical with respect to the Y-axis, and the intensity peak is in the Y-axis. The magnitude of this peak in FIG. $24A_1$ is larger than that in FIG. $24B_1$. In this case, the detection signals obtained by photodetectors 331-1 and 331-2 of the two-divided photodetector 331 are the same as those obtained by photodetectors 332-1 and 332-2 of the two-divided photodetector 332, so that the signals obtained through differential detection by the differential detection amplifiers 333 and 334 are both zero. Therefore, the signal obtained by the differential detection amplifier 335 is also zero.

When, on the other hand, the magnetic domain exists in the transferable area 319 (FIG. 18B), the light intensity distributions on the two-divided photodetector 331 and 332 are as shown in FIGS. $24B_1$ and $24D_1$. The distribution peaks appear on each side of the X-axis with respect to the Y-axis, i.e., on the + and the − side, respectively. The magnitude of a peak is larger on the − side in the case of FIG. $24B_1$. In the case of FIG. $24D_1$, on the other hand, it is larger on the + side.

Accordingly, when the differential amplifier 333 detects the signals of the photodetectors 331-1 and 331-2, a signal of negative value is obtained, and, when the differential amplifier 334 detects the signals of the photodetectors 332-1 and 332-2, a signal of positive value is obtained. Further, since the differential amplifier 335 detects the output signals of the differential amplifiers 334 and 333 by differential detection, a signal of positive value is obtained. Assuming that the peak of the signal at this time is $E_+'$, the reproduction signal 336 corresponding to the magnetic domain shown in FIG. 22A is the one shown in FIG. 22C, thus improving the signal quality as compared to that in the prior art.

While in FIG. $21A_1$ through $21G_2$ the light intensity distribution is in the vicinity of the re-imaging point of the condensing lens 327, FIGS. $25A_1$ through $25G_2$ show a case when the light intensity distribution is at a position in the optical axis which is spaced apart from the re-imaging point. When, in the case of FIGS. $25A_1$ through $25G_2$, a magnetic domain appears in the transferable area 319, the peak is divided into two, with the central portion therebetween becoming gradually depressed. The magnitudes of these two peaks are substantially the same. One peak corresponds to $R_+$, and the other peak corresponds to $R_-$. The middle section is a mixture of the two. To reproduce this magnetic domain, a signal similar to the reproduction signal shown in FIG. 22C can be obtained by using the reproducing apparatus shown in FIG. 23. In that case, however, the two-divided photodetectors 331 and 332 are arranged at positions in the optical axis which are spaced apart from the focal point of the condensing lens 329. Further, to improve the quality of the reproduction signal, it is possible to arrange a phase compensation plate, such as a wavelength plate, in the light beam of the reproduction optical system shown in FIG. 23. The values in the drawing represent total light quantities.

When performing overwriting with the above embodiment, the external magnetic field is modulated in accordance with the recording information while applying a light spot of a constant power to the magnetic layer. This arrangement involves a problem of leakage of a magnetic field in the vicinity of the position where the magnetic domain is recorded. In this embodiment, the adjusting layer 34 is provided between the reproducing layer 33 and the recording layer 35 so as to check the recorded information simultaneously with the recording. To further suppress the leakage of a magnetic field at the time of recording, it is also possible to provide a fourth magnetic laeyr between the recording layer 35 (the second magnetic layer) and the protective layer 36 shown in FIG. 14A. The characteristics of the fourth magnetic layer may be such that it exhibits a higher Curie temperature and lower coercive force at room temperature as compared with those of the recording layer 35. Of course, this fourth magnetic layer, which has the function of suppressing the leakage magnetic field at the time of recording, is applicable not only to the magneto-optical recording medium of the present invention, but also to conventional magneto-optical recording mediums. Further, apart from the example of the magneto-optical recording medium of the present invention shown in Table 1, it is also possible to adopt an amorphous alloy consisting of a combination of one or more transition metals and one or more rare earth metals. Main examples of the transition metals include Fe, Co and Ni, and main examples of the rare earth metals include Gd, Tb, Dy, Ho, Nd and Sm. Examples of a typical combination include TbFeCo, GdTbFe, GdFeCo, GdTbFeCo and GdDyFeCo.

What is claimed is:

1. A magneto-optical recording method for recording information on a magneto-optical recording medium and for verifying the recorded information, the medium having a first magnetic layer that exhibits a higher coercive force as compared with an external magnetic field at room temperature and a second magnetic layer that exhibits a higher coercive force and a lower Curie temperature as compared with those of the first magnetic layer, said method comprising the steps of:

rotating the medium;

irradiating the medium with a laser beam whose intensity is capable of raising the temperature of the second magnetic layer to a level close to the Curie temperature thereof;

recording information on the medium by applying the external magnetic field, modulated in accordance with the information, to a section of the medium that is irradiated with the laser beam so as to orient the direction of magnetization of the first magnetic layer in the irradiated section in the direction of the external magnetic field;

detecting reflected light of the laser beam from the irradiated section, simultaneously while performing said recording step;

reproducing the information formed on the medium during said recording step, on the basis of the results of said detecting step;

comparing the information reproduced during said reproducing step with the information recorded during said recording step; and repeating said recording step so as to again record the information, when the information reproduced in said reproducing step does not coincide with the information recorded in said recording step, as a result of the comparison made in said comparing step.

2. A magneto-optical recording method for recording information on a magneto-optical recording medium and for verifying the recorded information, the medium having a first magnetic layer that exhibits a higher coercive force as compared with an external magnetic field at room temperature, a second magnetic layer that exhibits a higher coercive force and a lower Curie temperature as compared with those of the first magnetic layer and a metal layer provided on the second magnetic layer, which metal layer has a heat conductivity that is higher than that of the second magnetic layer and has a thickness of between 20 Å and 70 Å, said method comprising the steps of:

rotating the medium;

irradiating the medium with a laser beam whose intensity is capable of raising the temperature of the second magnetic layer to a level close to the Curie temperature thereof;

recording information on the medium by applying the external magnetic field, modulated in accordance with the information, to a section of the medium that is irradiated with the laser beam so as to orient the direction of magnetization of the first magnetic layer in the irradiated section in the direction of the external magnetic field;

detecting reflected light of the laser beam from irradiated section, simultaneously while performing said recording step;

reproducing the information formed on the medium during said recording step, on the basis of the results of said detecting step;

comparing the information reproduced during said reproducing step with the information recorded during said recording step; and repeating said recording step so as to again record the information, when the information reproduced in said reproducing step does not coincide with the information recorded in said recording step, as a result of the comparison made in said comparing step.

3. A magneto-optical recording method for recording information on a magneto-optical recording medium and for verifying the recorded information, the medium having a first magnetic layer that exhibits a higher coercive force as compared with an external magnetic field at room temperature and a second magnetic layer that exhibits a higher coercive force and a lower Curie temperature as compared with those of the first magnetic layer, wherein each of the first and second magnetic layers has a magnetic compensation temperature, and when the lower one of the Curie temperature and the magnetic compensation temperature of the first and second magnetic layer, is a zero magnetization temperature, then the zero magnetization temperature of the first magnetic layer is higher than that of the second magnetic layer, said method comprising the steps of:

rotating the medium;

irradiating the medium with a laser beam whose intensity is capable of raising the temperature of the second magnetic layer to a level close to the Curie temperature thereof;

recording information on the medium by applying the external magnetic field, modulated in accordance with the information, to a section of the medium that is irradiated with the laser beam so as to orient the direction of magnetization of the first magnetic layer in the irradiated section in the direction of the external magnetic field;

detecting reflected light of the laser beam from the irradiated section, simultaneously while performing said recording step;

reproducing the information formed on the medium during said recording step, on the basis of the results of said detecting step;

comparing the information reproduced during said reproducing step with the information recorded during said recording step; and repeating said recording step so as to again record the information, when the information reproduced in said reproducing step does not coincide with the information recorded in said recording step, as a result of the comparison made in said comparing step.

4. A magneto-optical recording method for recording information on a magneto-optical recording medium and for verifying the recorded information, the medium having a first magnetic layer, a second magnetic layer that exhibits a lower Curie temperature as compared with that of the first magnetic layer and which exhibits a higher coercive force as compared with that of the first magnetic layer at room temperature and a third magnetic layer that is provided between the first and second magnetic layers and which exhibits a lower Curie temperature as compared with those of the first and second magnetic layers, a magnetizing direction of the third magnetic layer being in a direction of a film surface of the recording medium at room temperature and perpendicular to the film surface when heated, said method comprising the steps of:

rotating the medium;

irradiating the medium with a laser beam whose intensity is capable of raising the temperature of the third magnetic layer to a level close to the Curie temperature thereof;

recording information on the medium by applying an external magnetic field, modulated in accordance with the information, to a peripheral region of a section of the medium, which section is irradiated with the laser beam so as to orient in the direction of the external magnetic field the direction of magnetization of the section of the first magnetic layer adjacent to the section of the third magnetic layer, the magnetization of which section of the third magnetic layer is caused to disappear in said irradiating step, and so as to orient the direction of magnetization in the irradiated section of the second magnetic layer in the direction of the external magnetic field;

detecting reflected light of the laser beam from the irradiated section, simultaneously while performing said recording step;

reproducing the information formed on the medium during said recording step, on the basis of the results in said detecting step;

comparing the information reproduced in said reproducing step with the information recorded in said recording step; and repeating said recording step so as to again record the information, when the information reproduced in said reproducing step does not coincide with the information recorded in said recording step, as a result of the comparison in said comparing step.

5. A magneto-optical recording method for recording information on a magneto-optical recording medium and for verifying the recorded information by using a laser beam, the medium having a first magnetic layer that exhibits a higher coercive force as compared with an external magnetic field at room temperature and a second magnetic layer that exhibits a higher coercive force and a lower Curie temperature as compared with those of the first magnetic layer, said method comprising the steps of:

effecting relative movement between the laser beam and the medium;

irradiating the medium with the laser beam whose intensity is capable of raising the temperature of the second magnetic layer to a level close to the Curie temperature thereof;

recording information on the medium by applying the external magnetic field, modulated in accordance with the information, to a section of the medium that is irradiated with the laser beam so as to orient the direction of magnetization of the first magnet layer in the irradiated section in the direction of the external magnetic field;

detecting reflected light of the laser beam from the irradiated section, simultaneously while performing said recording step;

reproducing the information formed on the medium during said recording step, on the basis of the results of said detecting step;

comparing the information reproduced during said reproducing step with the information recorded during said recording step; and repeating said recording step so as to again record the information, when the information reproduced in said reproducing step does not coincide with the information recorded in said recording step, as a result of the comparison made in said comparing step.

6. A magneto-optical recording method for recording information on a magneto-optical recording medium and for verifying the recorded information by using a laser beam, the medium having a first magnetic layer that exhibits a higher coercive force as compared with an external magnetic field at room temperature, a second magnetic layer that exhibits a higher coercive force and a lower Curie temperature as compared with those of the first magnetic layer and a metal layer provided on the second magnetic layer, which metal layer has a heat conductivity that is higher than that of the second magnetic layer and has a thickness of between 20 Å and 70 Å, said method comprising the steps of:

effecting relative movement between the beam and the medium;

irradiating the medium with the laser beam whose intensity is capable of raising the temperature of the second magnetic layer to a level close to the Curie temperature thereof;

recording information on the medium by applying the external magnetic field, modulated in accordance with the information, to a section of the medium that is irradiated with the laser beam so as to orient the direction of magnetization of the first magnetic layer in the irradiated section in the direction of the external magnetic field;

detecting reflected light of the laser beam from the irradiated section, simultaneously while performing said recording step;

reproducing the information formed on the medium during said recording step, on the basis of the results of said detecting step;

comparing the information reproduced during said reproducing step with the information recorded during said recording step; and repeating said recording step so as to again record the information, when the information reproduced in said reproducing step does not coincide with the information recorded in said recording step, as a result of the comparison made in said comparing step.

7. A magneto-optical recording method for recording information on a magneto-optical recording medium and for verifying the recorded information by using a laser beam, the medium having a first magnetic layer that exhibits a higher coercive force as compared with an external magnetic field at room temperature and a second magnetic layer that exhibits a higher coercive force and a lower Curie temperature as compared with those of the first magnetic layer, wherein each of the first and second magnetic layers has a magnetic compensation temperature, and when the lower one of the Curie temperature and the magnetic compensation temperature of the first and second magnetic layers is a zero magnetization temperature, then the zero magnetization temperature of the first magnetic layer is higher than that of the second magnetic layer, said method comprising the steps of:

effecting relative movement between the laser beam and the medium;

irradiating the medium with the laser beam whose intensity is capable of raising the temperature of the second magnetic layer to a level close to the Curie temperature thereof;

recording information on the medium by applying the external magnetic field, modulated in accordance with the information, to a section of the medium that is irradiated with the laser beam so as to orient the direction of magnetization of the first magnetic layer in the irradiated section in the direction of the external magnetic field;

detecting reflected light of the laser beam from the irradiated section, simultaneously while performing said recording step;

reproducing the information formed on the medium during said recording step, on the basis of the results of said detecting step;

comparing the information reproduced during said reproducing step with the information recorded during said recording step; and repeating said recording step so as to again record the information, when the information reproduced in said reproducing step does not coincide with the information recorded in said recording step, as a result of the comparison made in said comparing step.

8. A magneto-optical recording method for recording information on a magneto-optical recording medium and for verifying the recorded information, the medium having a first magnetic layer, a second magnetic layer that exhibits a lower Curie temperature as compared with that of the first magnetic layer and which exhibits a higher coercive force as compared with that of the first magnetic layer at room temperature and a third magnetic layer that is provided between the first and second magnetic layers and which exhibits a lower Curie temperature as compared with those of the first and second magnetic layers, said method comprising the steps of:

irradiating the medium with a laser beam whose intensity is capable of raising the temperature of the third magnetic layer to a level close to the Curie temperature thereof;

recording information on the medium by applying an external magnetic field, modulated in accordance with the information, to a peripheral region of a section of the medium, which section is irradiated with the laser beam so as to orient in the direction of the external magnetic field the direction of magnetization of the section of the first magnetic layer adjacent to the section of the third magnetic layer, the magnetization of which section of the third magnetic layer is caused to disappear by said irradiating step, and so as to orient the direction of magnetization in the irradiated section of the second magnetic layer in the direction of the external magnetic field;

detecting reflected light of the laser beam from the irradiated section, simultaneously while performing said recording step;

reproducing the information formed on the medium during said recording step, on the basis of the results in said detecting step;

comparing the information reproduced in said reproducing step with the information recorded in said recording step; and repeating said recorded step so as to again record the information, when the information reproduced in said reproducing step does not coincide with the information recorded in said recording step, as a result of the comparison made in said comparing step.

* * * * *

UNITED STATES PATENT AND TRADEMARK OFFICE
CERTIFICATE OF CORRECTION

PATENT NO. : 5,428,586
DATED : June 27, 1995
INVENTOR(S) : TADASHI KOBAYASHI, ET AL.

It is certified that error appears in the above-indentified patent and that said Letters Patent is hereby corrected as shown below:

ON THE COVER PAGE:

Under "OTHER PUBLICATIONS"

"Patent Abstracts of Japan, No. 61-276149, vol. 11, No. 137, May 1987." and
"Patent Abstracts of Japan, No. 03-073448, vol. 15, No. 237, Jun. 1991." (second occurrence of each) should be deleted.

IN THE DISCLOSURE:

COLUMN 8:

Line 37, "by" should read --by being--.

COLUMN 14:

Line 21, "singal" should read --signal--.

COLUMN 19:

Line 6, "($P_+$, $S_{31}$)," should read --($P_+$, $S_-$),--.

UNITED STATES PATENT AND TRADEMARK OFFICE
CERTIFICATE OF CORRECTION

PATENT NO. : 5,428,586
DATED : June 27, 1995
INVENTOR(S) : TADASHI KOBAYASHI, ET AL.

It is certified that error appears in the above-indentified patent and that said Letters Patent is hereby corrected as shown below:

COLUMN 20:

Line 8, "FIGS. 21A," should read --FIGS. $21A_1$--; and "diagrams" should read --are diagrams--.

COLUMN 21:

Line 47, "and $24C_1$" should read --$24C_1$--.

COLUMN 22:

Line 50, ""laeyr" should read --layer--.

COLUMN 24:

Line 25, "layer," should read --layers--.

COLUMN 26:

Line 20, "beam" should read --laser beam--.

Signed and Sealed this

Twenty-fourth Day of October, 1995

Attest:

BRUCE LEHMAN

*Attesting Officer*   *Commissioner of Patents and Trademarks*